US012143177B2

(12) United States Patent
Abdelsadek et al.

(10) Patent No.: US 12,143,177 B2
(45) Date of Patent: Nov. 12, 2024

(54) DISTRIBUTED MULTIPLE-INPUT MULTIPLE-OUTPUT LOW EARTH ORBIT SATELLITE SYSTEMS AND METHODS

(71) Applicant: MacDonald, Dettwiler and Associates Corporation, Sainte-Anne-de-Bellevue (CA)

(72) Inventors: Mohammed Abdelsadek, Kanata (CA); Gunes Karabulut Kurt, Montreal (CA); Halim Yanikomeroglu, Ottawa (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 50 days.

(21) Appl. No.: 18/074,893

(22) Filed: Dec. 5, 2022

(65) Prior Publication Data

US 2023/0179273 A1 Jun. 8, 2023

Related U.S. Application Data

(60) Provisional application No. 63/264,890, filed on Dec. 3, 2021.

(51) Int. Cl.
 H04L 23/02 (2006.01)
 H04B 7/0417 (2017.01)
 H04B 7/0456 (2017.01)

(52) U.S. Cl.
 CPC ......... *H04B 7/0465* (2013.01); *H04B 7/0417* (2013.01)

(58) Field of Classification Search
 CPC ....... H04L 12/4003; H04L 2012/06421; H04L 47/83; G01S 11/02; G01S 19/01;
 (Continued)

(56) References Cited

U.S. PATENT DOCUMENTS 9,363,712 B2 6/2016 Chuberre et al.
10,177,837 B2 1/2019 Ravishankar et al.
(Continued)

FOREIGN PATENT DOCUMENTS

EP 3018836 B1 7/2017
WO 2016195813 A2 12/2016

OTHER PUBLICATIONS

Yang et al. "Seamless Handover in Software-Defined Satellite Networking", IEEE Communications Letters, vol. 20, No. 9, pp. 1768-1771, 2016.
(Continued)

*Primary Examiner* — Khai Tran
(74) *Attorney, Agent, or Firm* — Own Innovation Inc.; James W. Hinton; Kent C. Howe

(57) ABSTRACT

Satellites provide connectivity in remote and rural areas as well as providing applications and services elsewhere on earth and in space. Existing satellite networks will be increasingly augmented by ultra-dense deployments of interconnected satellites providing low Earth orbit (LEO) constellations. However, such satellites only offer short-term line-of-sight access requiring ongoing handovers during the duration of a terminal's access. Accordingly, to exploit these LEO constellations the inventors have established methodologies exploiting distributed massive multiple-input multiple-output technology for a user terminal to be connected to a cluster of LEO satellites. Further, distributed joint power allocation and handover management techniques are outlined for improving the power allocation and handover management processes in a cross-layer manner such that enhanced network throughput and reduced handover rate are provided whilst taking into account quality-of-service demands of terminals and the power capabilities of the LEO satellites.

9 Claims, 11 Drawing Sheets

(58) Field of Classification Search
CPC .... G01S 13/955; G06F 1/3209; G06F 1/3246; G06F 40/197; H04B 7/18513; H04B 7/195
USPC .......................................... 375/262, 260, 267
See application file for complete search history.

(56) References Cited

U.S. PATENT DOCUMENTS

| | | | |
|---|---|---|---|
| 10,374,692 | B1 | 8/2019 | Banerian et al. |
| 10,944,471 | B2 | 3/2021 | Ravishankar et al. |
| 10,998,965 | B2 | 5/2021 | Tong et al. |
| 2017/0141841 | A1* | 5/2017 | Clemmensen ....... H04B 7/1858 |
| 2019/0149634 | A1* | 5/2019 | Coleman ................ H04L 67/63 709/238 |
| 2019/0181946 | A1 | 6/2019 | Wendling |
| 2020/0187014 | A1 | 6/2020 | Sevindik |

OTHER PUBLICATIONS

Li et al. "Forecast Based Handover in an Extensible Multi-Layer LEO Mobile Satellite System", IEEE Access, vol. 8, pp. 42768-42783, 2020.

Wu et al., "A Graph-Based Satellite Handover Framework for LEO Satellite Communication Networks", IEEE Communications Letters, vol. 20, No. 8, pp. 1547-1550, 2016.

Wu et al., "A Satellite Handover Strategy Based on the Potential Game in LEO Satellite Networks", IEEE Access, vol. 7, pp. 133641-133652, 2019.

Erdogan et al., "Site Diversity in Downlink Optical Satellite Networks Through Ground Station Selection", IEEE Access, vol. 9, pp. 31179-31190, 2021.

Feng et al., "A Satellite Handover Strategy Based on MIMO Technology in LEO Satellite Networks", IEEE Communications Letters, vol. 24, No. 7, pp. 1505-1509, 2020.

Goto et al., " LEO-MIMO Satellite Systems for High Capacity Transmission", IEEE Global Communications Conference (GLOBECOM), pp. 1-6, 2018.

You et al., "Massive MIMO Transmission for LEO Satellite Communications", IEEE Journal on Selected Areas in Communications, vol. 38, No. 8, pp. 1851-1865, 2020.

You et al., "Intelligent Reflecting Surface with Discrete Phase Shifts: Channel Estimation and Passive Beamforming", IEEE International Conference on Communications (ICC), pp. 1-6, 2020.

Arnau et al., " Dissection of Multibeam Satellite Communications with a Large-scale Antenna System Toolbox", 20th European Wireless Conference, pp. 1-6, 2014.

Ngo et al., "Cell-Free Massive MIMO Versus Small Cells", IEEE Transactions on Wireless Communications, vol. 16, No. 3, pp. 1834-1850, 2017.

Chaudhry et al., "Free Space Optics for Next-Generation Satellite Networks", IEEE Consumer Electronics Magazine, vol. 10, No. 6, pp. 21-31, 2021.

Interdonato et al., "Ubiquitous cell-free Massive MIMO communications", EURASIP Journal on Wireless Communications and Networking, vol. 2019, No. 1, p. 1-13, 2019.

Chen et al., "Channel Hardening and Favorable Propagation in Cell-Free Massive MIMO With Stochastic Geometry", IEEE Transactions on Communications, vol. 66, No. 11, pp. 5205-5219, 2018.

Björnson et al., "Making Cell-Free Massive MIMO Competitive With MMSE Processing and Centralized Implementation", IEEE Transactions on Wireless Communications, vol. 19, No. 1, pp. 77-90, 2019.

Nayebi et al., "Precoding and Power Optimization in Cell-Free Massive MIMO Systems", IEEE Transactions on Wireless Communications, vol. 16, No. 7, pp. 4445-4459, 2017.

Vazquez et al., "Precoding in Multibeam Satellite Communications: Present and Future Challenges", IEEE Wireless Communications, vol. 23, No. 6, pp. 88-95, 2016.

\* cited by examiner

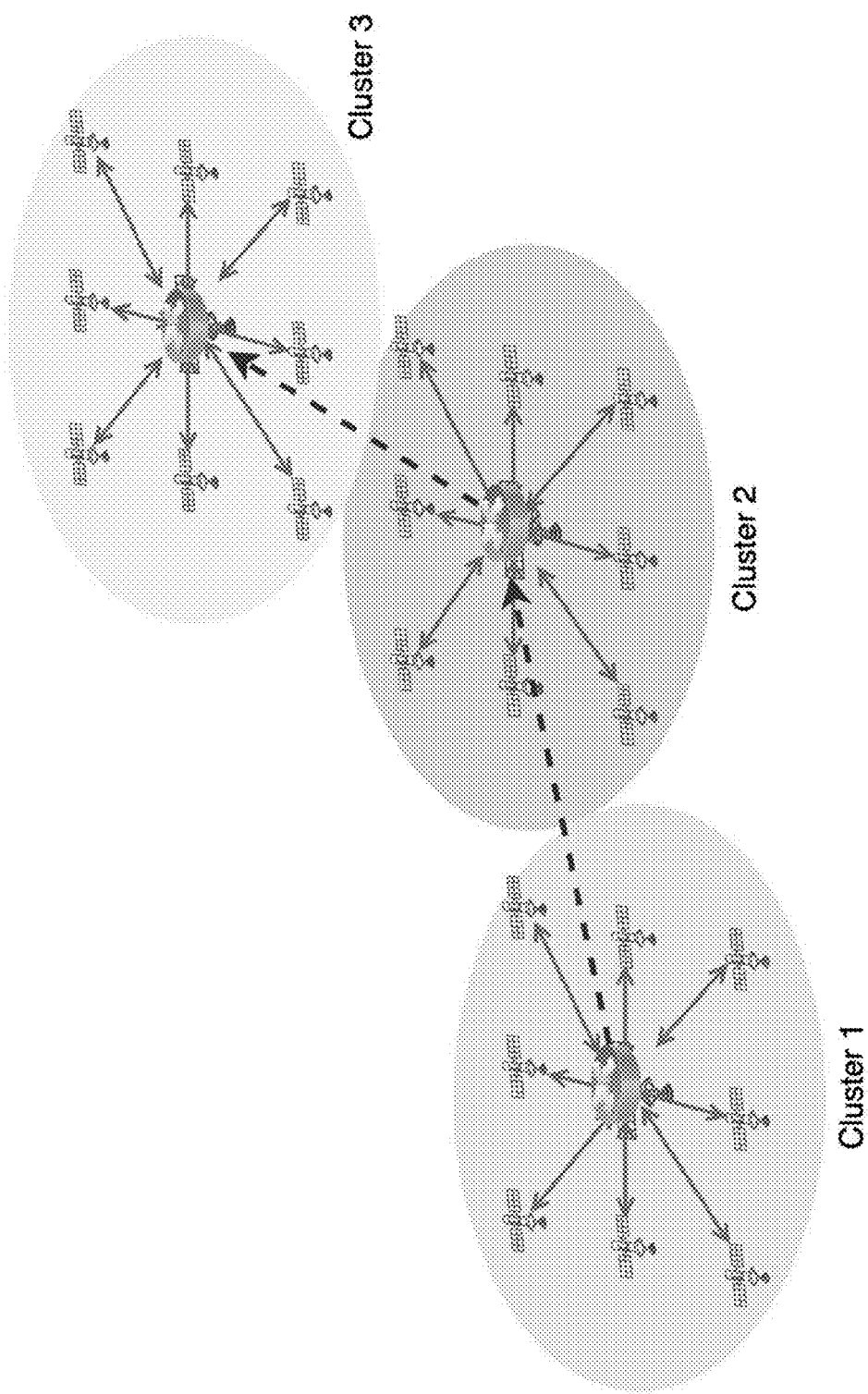

DISTRIBUTED MULTIPLE-INPUT MULTIPLE-OUTPUT LOW EARTH ORBIT SATELLITE SYSTEMS AND METHODS

CROSS-REFERENCE TO RELATED APPLICATIONS

This patent application claims the benefit of priority from U.S. Provisional Patent Application 63/264,890 filed Dec. 3, 2021; the entire contents of which are incorporated herein by reference.

FIELD OF THE INVENTION

This patent application relates to satellite systems and more particularly to low earth orbit satellites (LEOS) and methods and systems for managing communications via distributed massive multiple-input multiple-output LEOS configurations.

BACKGROUND OF THE INVENTION

Satellites are envisaged to play a critical role in future communication networks. Although satellite networks (Sat-Nets) are considered to be one of the most promising solutions for connecting the unconnected in remote and rural areas, they can provide a plethora of additional applications and services elsewhere on earth and in space. In this regard, SatNets can be used to reinforce connectivity solutions in underserved areas, and there is a growing interest in utilizing satellite systems to realize ubiquitous Internet of Things (IoT). Moreover, SatNets can enable more efficient backhaul services, data offloading applications, space exploration, among other benefits and use cases. In the near future, these SatNets will be augmented by the ultra-dense deployment of interconnected satellites and will characterize future low Earth orbit (LEO) mega-constellations.

Accordingly, it would be beneficial to exploit these in addressing and overcoming the issues currently associated with LEO SatNets for a more efficient network capable of connecting the unconnected. Accordingly, the inventors propose a novel LEO SatNet architecture based on distributed massive multiple-input multiple-output (DM-MIMO) technology allowing ground user terminals to be connected to a cluster of LEO satellites.

Given the mobility of LEO satellites, versus geostationary satellites, and accordingly the changing identities of the LEO satellites within the sky over a user's terminal, it would be beneficial to have a handover methodology. To this end, the inventors propose what they refer to as a distributed joint power allocation and handover management (D-JPAHM) technique that optimizes the power allocation and handover management processes in a cross-layer manner. Such a framework allows for enhancing network throughput and reducing handover rate whilst taking into account the quality-of-service (QoS) demands of user terminals and the power capabilities of the LEO satellites.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to satellite systems and more particularly to low earth orbit satellites (LEOS) by providing methods and systems for managing communications via distributed massive multiple-input multiple-output LEOS configurations.

In accordance with an embodiment of the invention there is provided a communications network comprising:
    a plurality of satellites, each satellite providing a satellite access point (SAP);
    a plurality of super satellite nodes (SSNs), each SSN comprising a network processing unit (NPU); wherein
    each SSN establishes a cluster with a defined subset of the plurality of satellites; and
    the cluster communicates with a user terminal (UT).

In accordance with an embodiment of the invention there is provided a method of communicating to a user terminal (UT) comprising:
    providing a plurality of satellites, each satellite providing a satellite access point (SAP); and
    providing a plurality of super satellite nodes (SSNs), each SSN comprising a network processing unit (NPU); wherein
    each SSN establishes a cluster with a defined subset of the plurality of satellites; and
    the cluster communicates with the UT.

In accordance with an embodiment of the invention there is provided a method of communicating by a user terminal (UT) comprising:
    communicating with a cluster with the UT; wherein
    the cluster comprises a super satellite node (SSN) of a plurality of SSNs and a defined subset of a plurality of satellites each providing a satellite access point (SAP);
    each SSN comprises a network processing unit (NPU) and establishes its own cluster.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 14 depicts data routing within satellite clusters of a DM-MIMO LEO SatNet according to an embodiment of the invention.

DETAILED DESCRIPTION

Figure 1:
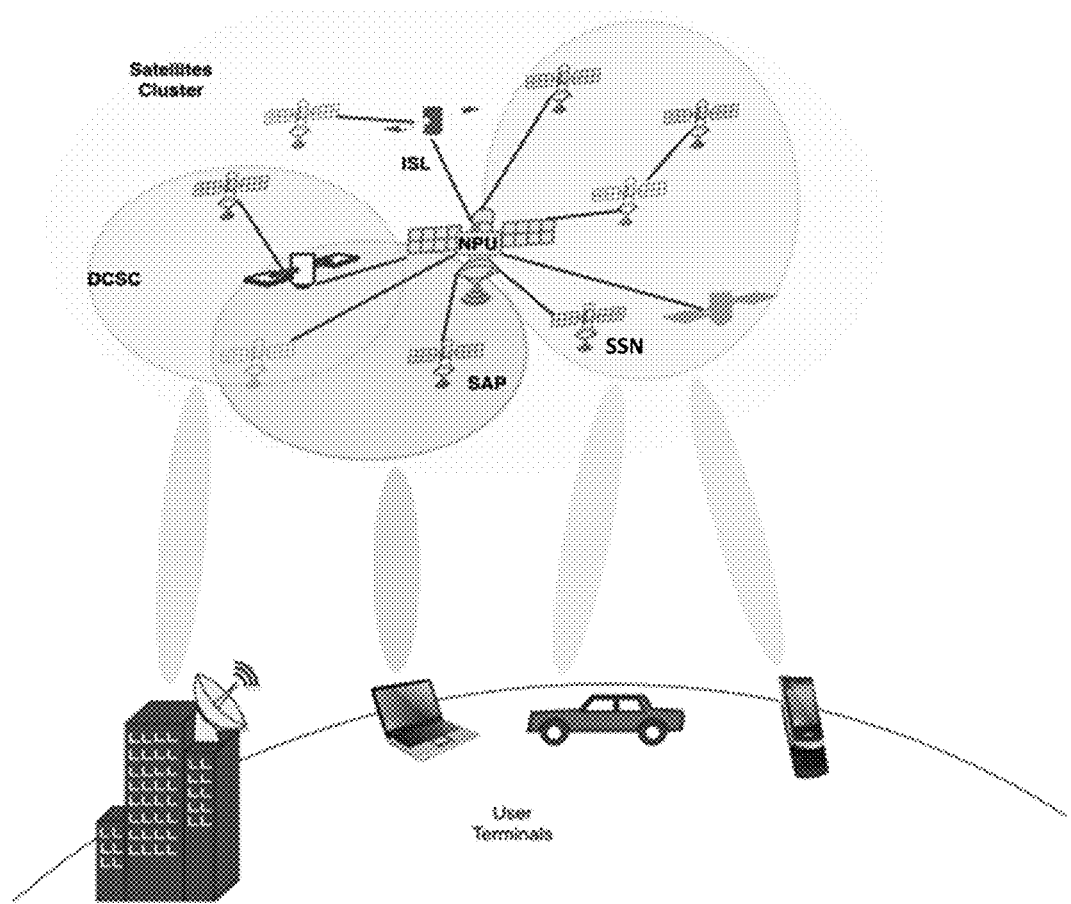
FIG. 1 depicts a distributed massive multiple-input multiple-output (DM-MIMO) based low Earth orbit (LEO) satellite network (SatNet) according to an embodiment of the invention.

The present invention is directed to satellite systems and more particularly to low earth orbit satellites (LEOS) and methods and systems for managing communications via distributed massive multiple-input multiple-output LEOS configurations.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment," "an embodiment," "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may," "might," "can" or "could" be included, that particular component, feature, structure, or characteristic is not required to be included.

Reference to terms such as "left," "right," "top," "bottom," "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including," "comprising," "consisting" and grammatical variants thereof do not preclude the addition of one or more components, features, steps, integers, or groups thereof and that the terms are not to be construed as specifying components, features, steps, or integers. Likewise, the phrase "consisting essentially of," and grammatical variants thereof, when used herein is not to be construed as excluding additional components, steps, features integers or groups thereof but rather that the additional features, integers, steps, components, or groups thereof do not materially alter the basic and novel characteristics of the claimed composition, device, or method. If the specification or claims refer to "an additional" element, that does not preclude there being more than one of the additional element.

Section 1: Overview and Background

As noted above, satellites are envisaged to play a critical role in future communication networks and are considered to be one of the most promising solutions for connecting the unconnected in remote and rural areas. However, satellites can also provide a plethora of additional applications and services elsewhere on earth and in space. These multiple use cases of SatNets have resulted in attention from network operators, standardization bodies, and manufacturing companies alike. For example, the Third Generation Partnership Project (referred to as 3GPP, an umbrella organization for a number of standards organizations for mobile telecommunications, see https://www.3gpp.org/) has studied the integration of a satellite component into terrestrial fifth generation (5G) networks. Amongst these studies were those for supporting non-terrestrial networks (NTN) (e.g., satellites and high-altitude platform stations (HAPS)) in the 5G New Radio (NR).

While geostationary Earth orbit (GEO) satellites have been used for a long time to offer connectivity and broadcast services, there are several issues associated with their services, such as long delay, high path loss, and over-subscription. These drawbacks are in addition to the costs of manufacturing and deploying GEO satellites. Alternatively, low Earth orbit (LEO) satellites are characterized by low latency and low path loss communications due to their lower deployment altitudes (i.e., as low as 300 km compared to 36,000 km for GEOs). Further, the deployment costs of LEOs are much lower than GEOs whereby such LEO SatNets should be able to provide low-cost services with high quality. Accordingly, thousands of LEO satellites are planned for launch to build mega-constellations orbiting the Earth by 2030.

There are several drawbacks of current LEO satellite communications compared to terrestrial networks including large path loss, frequent handovers, and long latency. Considering initial large path loss then due to the high altitude of satellites (compared to the distance between the user equipment and terrestrial base stations), there is a large power loss associated with satellite communications. To compensate for this link budget issue, big dish antennas at the transmitter and receiver are required. This means that broadband connectivity can be supported only by very small-aperture-terminals (VSATs), which does not include handheld devices (e.g., smartphones). Instead, only low-rate services (e.g., SMS and voice communications) can be provided for such types of devices with low capabilities. However, the inventive embodiments of the invention described above and below allow for smaller antennas and potentially satellite communications from handheld devices.

Considering frequent handovers, then the motion of LEO satellites relative to the user terminals (UTs) on the ground requires that UTs are required to switch links among different LEO satellites to maintain a network connection. This handover process is implemented at the link-layer and network-layer. The former used for switching over communication links from one satellite to another one in the UT's visibility. By contrast, a network-layer handover is used for switching higher-layer protocols (e.g., transmission control protocol (TCP), user datagram protocol (UDP)) to a new Internet protocol (IP) address of a UT when it is connected to a different home network due to a satellite handover. The rate of this satellite handover is high because the LEO satellites are only visible to UTs for a few minutes at a time as they pass in orbit. This high rate of satellite handover entails high signaling overhead, throughput losses, processing delay, data forwarding, and location update issues. Therefore, the mobility of LEO satellites can have a significant impact on the network performance, spectrum utilization, and users' quality of service (QoS). By migrating the communications to a DM-MIMO cluster of LEO satellites the inventive embodiments of the invention described above and below allow the handover frequency to be reduced as we are not concerned with individual satellite visibility but visibility of a cluster of satellites.

With respect to latency then the latency of LEO satellite communication is 5-50 ms, which is high compared to terrestrial networks. This is inevitable due to the long propagation delay. Therefore, satellite communications are not suitable for delay-sensitive applications. This aspect cannot be addressed through architecture etc. but only by lowering the orbit of the LEO satellites which results in shorter visibility of single satellites and increased handovers. By migrating the communications to a DM-MIMO cluster of LEO satellites the inventive embodiments of the invention described above and below allow the handover frequency to be reduced as we are not concerned with individual satellite visibility but visibility of a cluster of satellites such that lower orbit LEOs with shorter individual visibility can be employed thereby reducing latency.

Despite these drawbacks there are several opportunities for new LEO constellations compared to old ones to overcome the previously discussed drawbacks. These opportunities include:

Ultra-dense deployment: One significant difference between current/future LEO satellite networks (SatNets) and old LEO constellations is ultra-dense deployment. That is, future LEO mega-constellations will include thousands of satellites. This increases the number of LEO satellites a UT can see and potentially will allow UTs on the ground to have access to ten or more LEO satellites in their field of visibility at the same time.

High-speed inter-satellite links (ISLs): Utilizing technologies such as free-space optical (FSO) communications, future LEO satellites will be interconnected via high-speed, low latency links. This allows a fast and reliable exchange of large amounts of data among the satellites.

Software-based Configuration: Future LEO SatNets are expected to add the flexibility of software configuration/operation utilizing techniques such as software-defined networking (SDN) and network function virtualization (NFV). This enables the dynamic configuration of the LEO satellites based on their changing topology.

Within the prior art, several approaches have been proposed to address challenges associated with the high mobility of LEO satellites. For example, Yang et al. (IEEE Communications Letters, vol. 20, no. 9, pp. 1768-1771, 2016) proposed a software-defined networking (SDN) architecture to control LEO satellites using a controller on the ground that connects to the LEOS via a GEO satellite. Along similar lines, Li et al. (IEEE Access, vol. 8, pp. 42768-42783, 2020) proposed an extensible architecture utilizing several layers of terrestrial relays (TRs), HAPSs, LEOs, and GEOs for relay purposes, and the authors studied the handover procedure among these different systems.

However, using GEOs in the network, as investigated in these studies, entails a long-delay segment in the communication cycle that directly impacts the QoS of users and requires coordination between different satellite operators. Each of these studies, together with other current approaches, see for example Wu et al. (IEEE Communications Letters, vol. 20, no. 8, pp. 1547-1550, 2016 and IEEE Access, vol. 7, pp. 133641-133652, 2019), have focused on the connectivity of UTs with a single satellite in their visibility.

Therefore, the UT's service time (i.e., connection time without handover interruption) is limited by the visibility of a single LEO satellite, which is only a few minutes (about 10 minutes for example with the Iridium system). The handover rate is therefore inevitably high, regardless of the adopted handover management technique. Moreover, most of the prior art is based on old LEO constellations (e.g., Iridium) and accordingly does not exploit the features of the new LEO mega-constellations, such as those of SpaceX's Starlink and Telesat's Lightspeed, for example. To overcome the challenges of single-satellite connectivity, the use of multiple-input multiple-output (MIMO) techniques in satellite communications, and in LEO SatNets in particular, has only been investigated to a limited extent.

Former studies have investigated the connection of ground terminals to two GEO satellites, or to two antennas deployed on a single GEO satellite, for diversity purposes to address fading issues (e.g., in rainy and foggy weathers). As for LEO satellites, Erdogan et al. (IEEE Access, vol. 9, pp. 31179-31190, 2020) focused on feeder links by studying the connection to multiple ground stations via optical links to realize site diversity in future LEO SatNets. In contrast Feng et al (IEEE Communications Letters, vol. 24, no. 7, pp. 1547-1550, 2020) adopted a bipartite graph model for ground gateway stations and the multiple LEO satellites visible to them. The authors solved this multi-connectivity problem by using maximum matching techniques. However, the authors utilized basic MIMO techniques (i.e., considering the general case that each ground station node can be connected to multiple satellite nodes and vice versa) and assumed that the ground stations had accurate information about the motion of the LEO satellites in their visibility. In contrast, Goto (IEEE Global Communications Conference (GLOBECOM), pp. 1-6, 2018) a similar MIMO model was considered and analyzed for the capacity of the LEO-MIMO links by taking into consideration the Doppler shift due to the motion of the satellites. Nevertheless, these studies considered classical MIMO models to describe the connectivity of ground UTs with multiple satellites without investigating the details of the network architecture, channel estimation, precoding, and interference between users.

On another front, massive MIMO in LEO SatNets was studied by You et al. (IEEE Journal on Selected Areas in Communications, vol. 38, no. 8, pp. 1851-1865, 2020 and IEEE International Conference on Communications (ICC), pp. 1-6, 2020) assuming that the LEO satellites use arrays of uniform planar antennas that can realize massive MIMO. However, due to the line-of-sight (LoS) connection to the ground terminals, the collocated satellite massive MIMO system cannot achieve the desired benefits as in terrestrial networks due to the so-called "unfavourable propagation" environment, see for example Arnau et al. ($20^{th}$ European Wireless Conference, pp. 1-6, 2014).

One significant difference between future LEO SatNets and old LEO constellations is ultra-dense deployment. That is, future LEO mega-constellations will include thousands of satellites. For example, SpaceX is planning to deploy 30,000 LEO satellites for their second-generation constellation in addition to the current plan of around 12,000 satellites. This means that multiple LEO satellites will be visible to ground UTs simultaneously, which will open the door for advanced distributed MIMO techniques, such as the inventive distributed massive MIMO (DM-MIMO).

A cell-free massive MIMO (CF-mMIMO) was recently proposed for next-generation terrestrial networks that build on coordinated multi-point (CoMP) and network MIMO techniques for large spectral efficiency, power efficiency, and network flexibility gains, see for example Ngo et al. (IEEE Transactions on Wireless Communications, vol. 16, no. 3, pp. 1834-1850, 2017). In terrestrial CF-mMIMO, multiple access points can be used to cooperatively communicate with users in a cell-free manner. The inventor's inventive technique is to exploit future LEO satellite networks providing an ultra-dense deployment, very high-speed intersatellite links (ISLs), and LoS connections with ground UTs to provide a distributed massive MIMO (DM-MIMO) architecture. Moreover, the DM-MIMO architecture enables the cross-layer design to jointly optimize the upper and lower layers in LEO SatNets. This cross-layer design is of utmost importance to LEO SatNets given that the network nodes are moving (i.e., the network topology is dynamic) and all links (with UTs, gateways, and other satellites) are wireless (radio frequency (RF) or free-space optical (FSO)). This means that the design of the lower layers has a significant impact on the performance of the upper ones.

Therefore, DM-MIMO can be leveraged for an efficient, resilient satellite network. The inventors have therefore established an innovative DM-MIMO-based LEO satellite network architecture and with a cross-layer design employing an artificial intelligence (AI)-based implementation.

Accordingly, embodiments of the invention have been investigated for several aspects by the inventors for a LEO SatNet architecture based on DM-MIMO techniques. These aspects include, network topology, required ISLs, duplexing mode, beamforming, power control, frequency reuse, routing, single-user (SU) and multi-user (MU) MIMO modes, user plane—control plane separation, cluster and sub-cluster form, and handover management strategies. Embodiments of the invention provide for a cross-layer design framework based on a proposed DM-MIMO-based architecture allowing power allocation and handover management processes to be jointly optimized. For this purpose, the inventors describe, below, the channel model, uplink training and channel estimation, downlink data transmission, and formulation of a multi-objective optimization problem. In this problem, the aggregate throughput is maximized while minimizing the handover rate. The inventors refer to this optimized cross-layer design as the distributed joint power allocation and handover management (D-JPAHM) technique.

The inventors introduce an AI-based implementation for the developed cross-layer control framework, which can be used in practical satellite systems. For this purpose, the inventors leverage deep learning to provide accurate predictions for the solution of the formulated multi-objective optimization problem without actually solving the problem. Deep learning provides several benefits compared to traditional optimization-based and heuristic approaches. For instance, it exploits offline computations to reduce the computational complexity of the online operation. It also adapts to changing environments, which is vital for the dynamic satellite network. Furthermore, the scalability and support of distributed data processing and storage provided by deep learning techniques are crucial for LEO satellites that are less capable compared to GEO satellites. However, it would be evident to one of skill in the art that other AI or machine learning (ML) processes may be employed to provide accurate predictions for the solution of the formulated multi-objective optimization problem without actually solving the problem without departing from the scope of the invention.

The inventors conducted extensive simulations to evaluate the performance of the proposed architecture, cross-layer design, and AI-based implementation. In addition, the inventors compared the performance with that of conventional approaches and architectures from the prior art. The simulation results, see for example FIGS. 10 to 13C, show the superiority of the novel DM-MIMO-based architecture and solutions according to embodiments of the invention compared to the traditional single-connectivity approach.

Section 2. DM-MIMO-Based SatNets Architecture and Management Procedures

2A. Topology

Referring to FIG. 1 there is depicted an overview of the proposed DM-MIMO-based LEO SatNet architecture according to embodiments of the invention. As depicted the satellites, e.g., LEO satellites, are divided into clusters. From a nomenclature viewpoint for consistency with DM-MIMO terminology, each satellite in the cluster is called a satellite access point (SAP). The inventors further consider that, in the event that a satellite has multiple antennas, each antenna would be considered a separate SAP. These SAPs are connected to a network processing unit (NPU) through ISLs for backhaul purposes.

This NPU can be deployed on a central satellite with more advanced computing capabilities than other satellites. These central satellites are called super satellite nodes (SSNs). The selection of the number of SSNs and SAPs in each cluster can be optimized on the basis of different performance objectives and associated deployment costs. Optionally, an SSN may be discrete specialized satellite design such that the SSN is not also an SAP for the DM-MIMO clusters. Optionally, the SSN may be distributed over multiple satellites rather than being centrally provided by a single satellite with additional ISLs and/or overhead allocated within the ISLs to manage the necessary communications between the satellites forming nodes of the NPU.

The exchange of the information between the SAPs and the NPU may be restricted to payload data and power control coefficients to reduce the backhaul signaling, as indicated within FIG. 1 by the arrows between the SAPs and the SSN for the DM-MIMO-based LEO SatNet. However, backhaul signaling does not present the same challenges as terrestrial networks. This is because the ISLs can use high-speed free space optical (FSO) communications, see for example Chaudhry et al. (IEEE Consumer Electronics Magazine, vol. 10, no. 6, pp. 21-31, 2021), which enables the information to be exchanged at high rate with low latency.

While the satellites within the Figures provided to aid in understanding of embodiments of the invention are depicted as being deployed upon a regular grid, it would be evident that the embodiments of the invention support SAPs that are not upon a regular grid and accordingly that the three-dimensional relationships between SAPs overall, and specifically within a cluster, may vary between any pair of SAPs and that this variation may also vary temporally as SAPs may not maintain relative positioning to one another in orbit. This is particularly evident when it is considered that embodiments of the invention may support a cluster being formed from SAPs from multiple LEO SatNet operators rather than a sole LEO SatNet operator.

2A1. Cluster and Sub-Cluster Formation

Each UT is connected to a cluster of satellites which is controlled by an SSN. As outlined above and below the satellite cluster to which the UT communicates will change as the cluster no longer becomes visible and the satellites within each cluster may also vary while the UT is communicating with that cluster this time or at another point in time. Accordingly, within embodiments of the invention the cluster may therefore be established in an ad-hoc manner by the SSN. Within other embodiments of the invention the cluster may be established in an ad-hoc manner and the SSN dynamically assigned to form the cluster or by a cluster through communications and protocols.

However, this does not mean that the UTs should communicate with the whole cluster all the time. Instead, each UT may be served by a subset of this cluster (which includes the special case of being served by the whole cluster) which the inventors refer to a Dynamic Cooperation Sub-Cluster (DCSC). The formation of clusters and DCSCs can be optimized by the network on the basis of different performance objectives and associated deployment costs. Examples of the parameters that determine the cluster formation and/or DCSCs formation include, but are not limited to, the following:

- Traffic load in the served area: The traffic load differs from spot to spot, e.g., urban compared to rural areas. Therefore, in hotspots, where a large volume of traffic is required to be supported, and the number of served UTs needs to be maximized, the clustering/sub-clustering process should utilize as many SAPs as possible to cover the traffic demand while satisfying the UTs' QoS clustering process can utilize a smaller number of SAPs.
- SAP Density and Capabilities: The capabilities (e.g., power, antennas, computing) of the SAPs included in the cluster/DCSC affects the performance of the network. Therefore, the density of available SAPs and their capabilities should be considered while forming the cluster/DCSC.
- Served UTs: There are different types of UTs that are served by satellite networks. Some UTs, such as IoT devices, need small data rates. Therefore, one SAP may be enough for such kinds of UTs. Nevertheless, one SAP may not be sufficient to serve handheld devices (e.g., smartphones) that require broadband connectivity.

Figure 2:
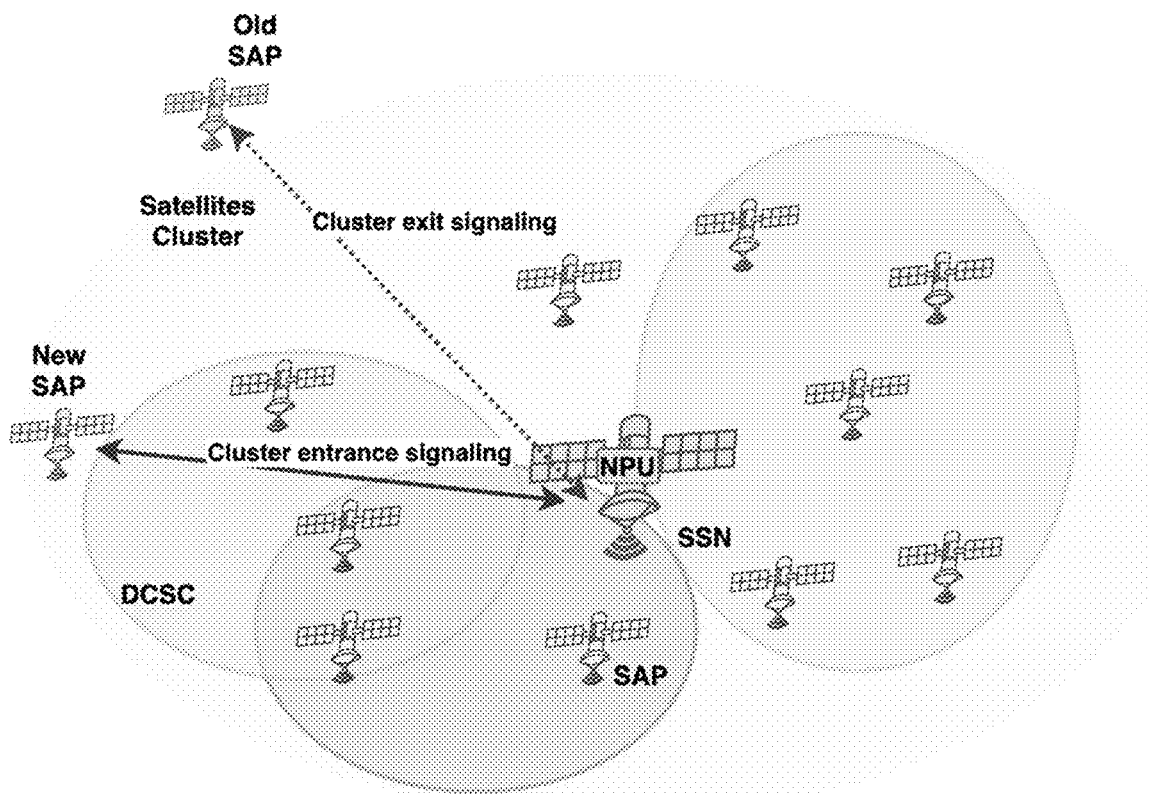
FIG. 2 depicts a schematic of satellite entry and exit from a cluster within a DM-MIMO LEO SatNet according to an embodiment of the invention.
Figure 3:
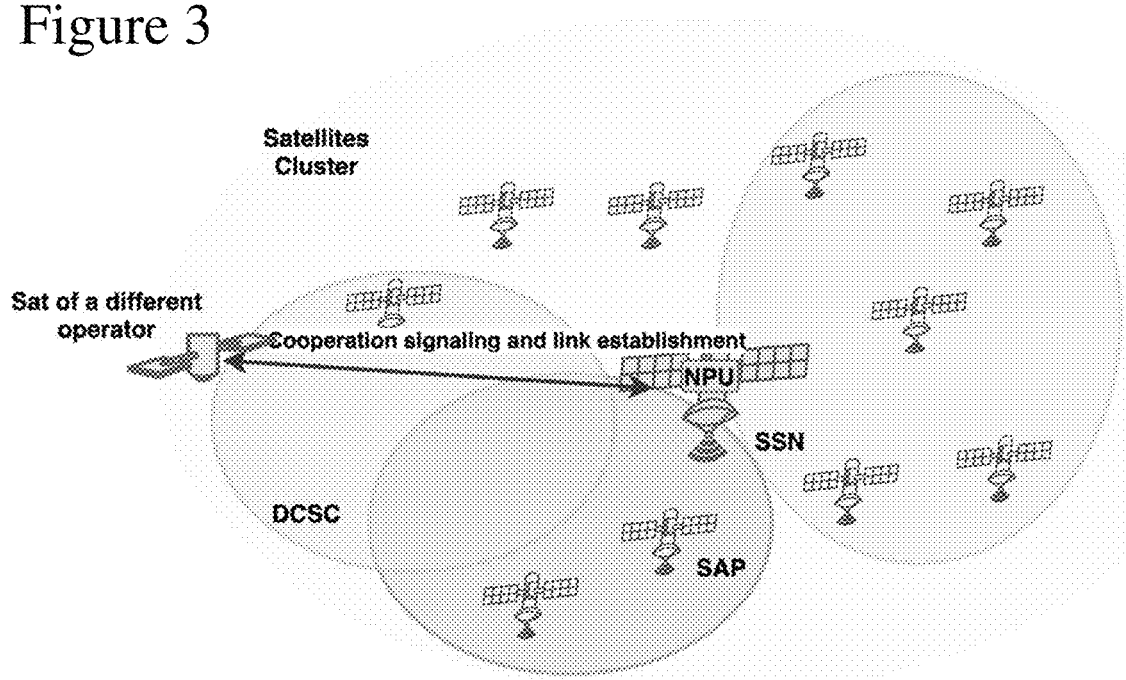
FIG. 3 depicts a schematic of cooperation between satellites of different constellations and/operators to form clusters within a DM-MIMO LEO SatNet according to an embodiment of the invention.

The incorporation of new SAPs in the cluster and exclusion of satellites can be implemented by means of cooperation signaling that is exchanged between the SSN and SAPs as shown in FIG. 2. These SAPs could be associated with the same constellation/operator or with different constellations/operators. In the latter case, this requires interoperability agreements between the different operators. Accordingly, the cooperation signaling can be implemented as depicted in FIG. 3 for example.

2B. Time Division Duplex Operation

In order to exploit the reciprocity of the uplink (UL) and downlink (DL) channels, time division duplexing (TDD) has been adopted for the duplexing mode in DM-MIMO systems within the exemplary embodiments of the invention described and depicted within this specification, see for example Ngo et al (IEEE Transactions on Wireless Communications, vol. 16, no. 3, pp. 1834-1850, 2017). However, it would be apparent to one of skill in the art that other duplexing schemes may be employed without departing from the scope of the invention.

For the purpose of channel estimation, both UL and DL pilots can be used, see for example Interdonato et al. (EURASIP Journal on Wireless Communications and Networking, vol. 2019, no. 1, p. 197, 2019). This is in contrast to other prior art DM-MIMO studies, see for example Ngo et al. (IEEE Transactions on Wireless Communications, vol. 16, no. 3, pp. 1834-1850, 2017), Chen et al. (IEEE Transactions on Communications, vol. 66, no. 11, pp. 5205-5219, 2018), and Bjornson et al. (IEEE Transactions on Wireless Communications, vol. 19, no. 1, pp. 77-90, 2019), where only UL pilots are considered. However, it would be apparent to one of skill in the art that only UL pilots can be employed within embodiments of the invention as UTs do not need to estimate their effective channel gain and use most of the TDD frame for data transmission.

Figure 4:
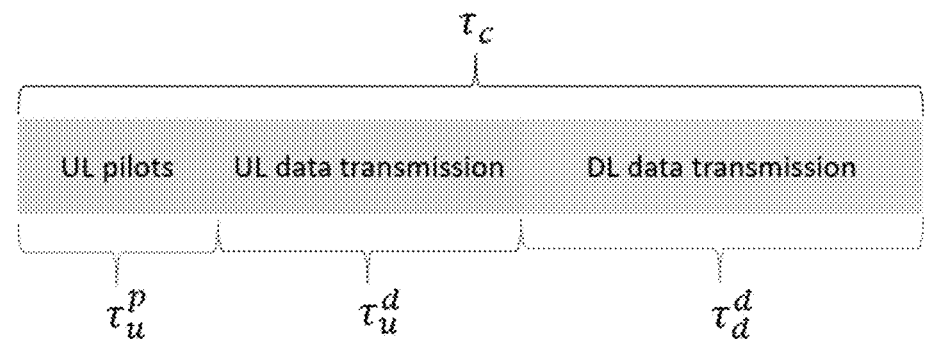
FIG. 4 depicts an exemplary time division duplexing (TDD) frame comprising uplink pilot transmission, uplink data transmission, and downlink data transmission for use within a DM-MIMO LEO SatNet according to embodiments of the invention.

Accordingly, within the description below the TDD is structured as depicted in FIG. 4 and is composed of three parts: one used for uplink pilot transmission, one for uplink data transmission, and one for downlink data transmission.

The channel coherence interval is defined as the time-frequency interval during which the channel characteristics can be considered static. This coherence interval depends on the channel condition, the mobility of the satellite and the UT, and the carrier frequency. The coherence interval samples or channel uses, $\tau_c$, are divided into three parts: the initial $\tau_u^p$ samples are used for UL pilot transmission, the next $\tau_u^d$ samples are used for UL data transmission, and the last id samples are reserved for DL data transmission. It is worth mentioning that the guard intervals are excluded from this coherence time interval. Utilizing the UL pilots, all the UL channels are estimated at the SAPs locally without forwarding them to the NPU. This supports the scalability of the network, since the signaling overhead is independent of the number of SAPs. Due to reciprocity, these channel estimates are valid for the DL direction as well. Therefore, the estimated channels are used for DL data precoding and UL data detection.

2C. Radio Resource Allocation

The novel embodiments of the invention support efficient radio resource allocation techniques such that these can exploit the advantages of the proposed architecture (including transmit and receive diversity) to achieve higher throughput for the connected terminals, ensuring QoS satisfaction, minimizing interference, and minimizing the handover rate. In this subsection, the inventors discuss different aspects of resource allocation for the proposed DM-MIMO-based SatNets architecture. It would be evident that the methods adopted within the embodiments of the invention described below may be varied, augmented and/or replaced with other methods without departing from the scope of the invention.

2C1: Pilot Assignment: UTs may be assigned mutually orthogonal UL pilots to minimize the interference between them. However, this requires the number of UL training samples, iu, to be more than the number of connected UTs, which is difficult in SatNets due to the large number of connected UTs. Therefore, subsets of the UTs are assigned to a common pilot from the mutually orthogonal pilot set. This results in what is known as pilot contamination, which needs to be taken into consideration while designing the resource allocation procedure. The pilot assignment can be implemented locally at the SAPs in a distributed manner or centrally at the NPU. The pilot assignment information can be transmitted to the UTs over the random-access channel during the random-access process.

2C2: Beamforming: Techniques such as maximum ratio processing (i.e., conjugate beamforming in the DL direction and matched filtering in the UL) can be employed to exploit the distributed channel estimation at the SAPs. This is considered one of the major benefits of using DM-MIMO, as this reduces the computational complexity and the required backhaul signaling between the SAPs and the NPU. However, other beamforming techniques, such as zero-forcing (ZF) and minimum mean square error (MMSE) can be used, see for example Bjornson et al. (IEEE Transactions on Wireless Communications, vol. 19, no. 1, pp. 77-90, 2019) and Nayebi et al. (IEEE Transactions on Wireless Communications, vol. 16, no. 7, pp. 4445-4459, 2017). These centralized techniques can be utilized to improve performance. However, these techniques require more backhaul signaling between the SAPs and NPU.

2C3: Frequency Reuse: By using precoding in the DL and maximum ratio combining for the UL transmissions, full frequency reuse (FFR) can be realized instead of using conventional four colour frequency reuse patterns to mitigate the interference between the spot beams, see for example Vazquez et al. (IEEE Wireless Communications, vol. 23, no. 6, pp. 88-95, 2016). This leads to efficient spectrum usage since the whole allocated spectrum can be used anytime and anywhere while minimizing the interference among users.

2C4: Power Control: Power control plays an essential role in optimizing the cooperative transmission and reception of SAPs to maximize the network throughput and ensure users satisfaction. The power allocation should consider the interference between the UTs, the pilot assignment, and the achievable data rates. In addition, power allocation can be optimized to maximize the service time of the UTs, thereby minimizing the handover rate. This is the focus of Section III.

2D. Handover Management

Figure 5A:
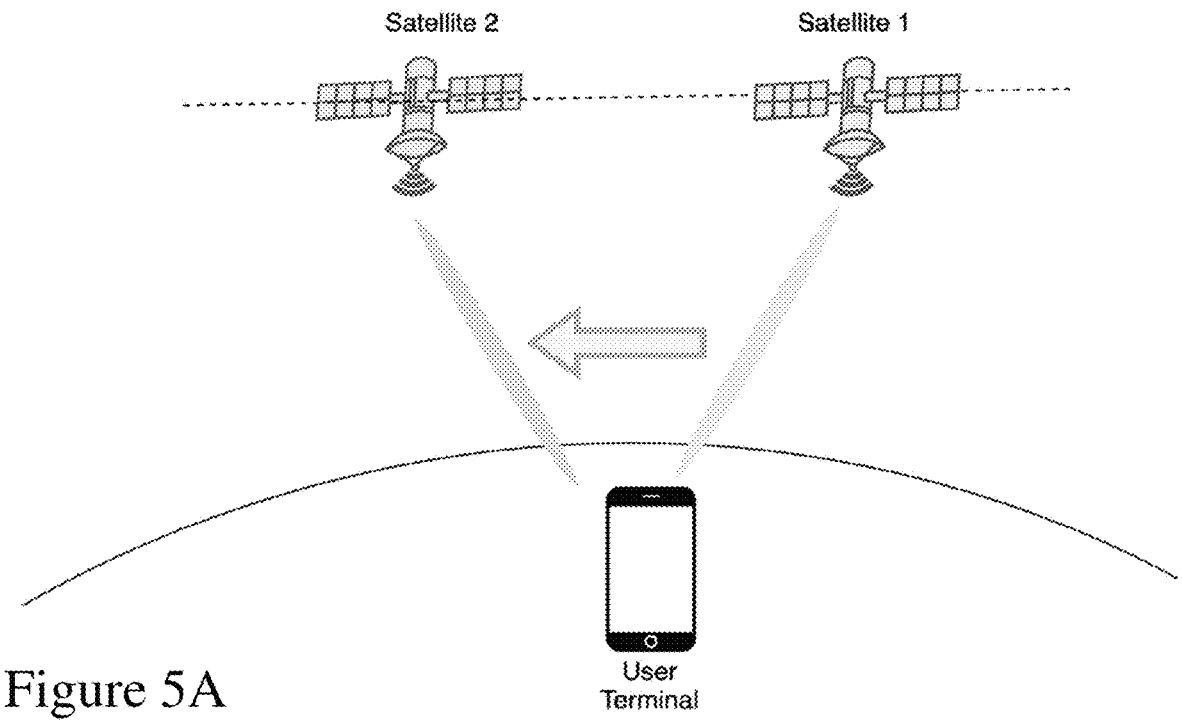
FIG. 5A depicts a prior art scenario where a user terminal switches its connections between individual satellites based on their visibility to the user terminal.

The traditional satellite handover process (i.e., based on single satellite connectivity) is depicted in FIG. 5A. In this case, when the signal level is below a certain threshold, the link is switched to the next LEO satellite in the cone visibility of the UT. This can be accomplished by using the satellite reference signals that are broadcast by the satellite. In the network layer, handover is required to forward the data arriving for the old address to the new home network, since the UT is given a new IP address in the new home network. As discussed above, the service time in this case is limited by the satellite visibility, which is a few minutes in LEO SatNets. However, using the proposed DM-MIMO architecture, the UT is connected to a cluster of satellites or SAPs. Consequently, the service time is limited by the visibility of the target cluster, which is longer than that of a single satellite. In addition, the resource allocation process can be optimized such that the service time is maximized. This minimizes the handover rate, associated losses, processing delays, and signaling overhead. In what follows, the inventors discuss the link-layer and network-layer handover processes based on the proposed DM-MIMO architecture.

2D1: Link-Layer Handover: Within DM-MIMO-based SatNets, power allocation can be adjusted such that the service times of the ground UTs or a specific UT are maximized. This is because the UTs are served by all SAPs in the serving cluster. Therefore, within embodiments of the invention the cooperative transmission of those SAPs can compensate for the signal level decaying due to the movement of the satellites. In addition, in the UL direction, the data is decoded on the basis of the received signals by all SAPs in the cluster.

Figure 5B:
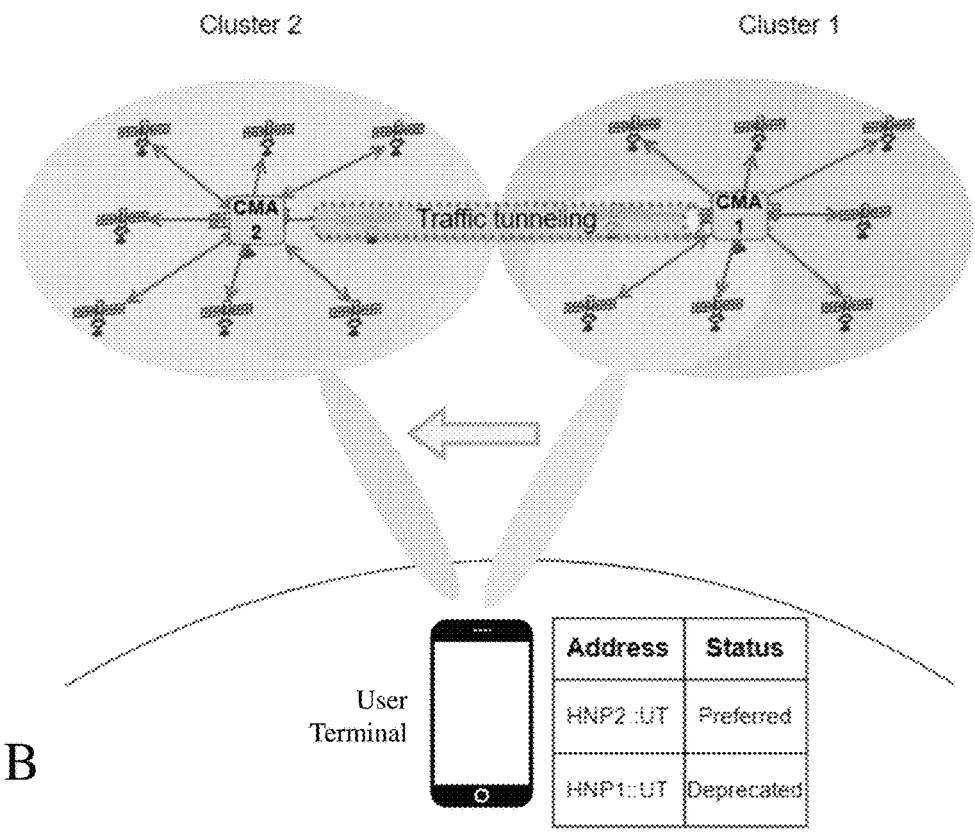
FIG. 5B depicts a handover processed at a cluster level which reduces the handover rate within an embodiment of the invention.

Nevertheless, at some point a cluster handover is required to switch to the next cluster when resource allocation cannot satisfy the UT's minimum required data rate level. This can be detected while allocating the radio resources (i.e., the transmit power), as detailed below. Further, as the next serving cluster is known, the handover decision can be confirmed by the next cluster that detects the UL pilot from the ground UT by its edge SAPs. FIG. 5B shows the handover between satellite clusters according to an embodiment of the invention when the minimum QoS level cannot be guaranteed by the old cluster's established link due to moving far from the UT.

2D2: Network-Layer Handover: When a link handover is triggered and implemented, a network-layer handover is or may also be required to assign a new address to the UT and forward the incoming data to the new home network. In terrestrial IP networks, several mobility management protocols are adopted, such as Mobile IPv6 (MIPv6) and Proxy Mobile IPv6 (PMIPv6). In these protocols, mobility anchors are used to establish tunnels to forward the data to the new network and update the binding cache. In the proposed DM-MIMO architecture, the addressing issues can be tackled by using cluster mobility anchors (CMAs) that are located in the SSNs of the clusters (i.e., along with the NPUs). When a link handover is implemented, the CMA of the new cluster provides a new home network prefix (HNP) to the UT and establishes a bidirectional tunnel with the old serving CMA such that the data are forwarded to the new cluster, as shown in FIG. 5B. In this scheme, the old IP address of the UT (HNP1::UT) becomes Deprecated, and the newly assigned address (HNP2::UT) becomes Preferred.

For DCSCs, the assignment may be implemented dynamically based on the UT's location, channel conditions, capabilities, and requirements. This DCSC assignment may, for example, be performed using the power control coefficients. For example, if the power assigned to a certain SAP-UT pair is zero, this means that this SAP is not in the DCSC of that UT.

2D3: Cross-Layer Design

As outlined above the DM-MIMO architecture according to the embodiments of the invention outlined above enables the cross-layer design to jointly optimize the upper and lower layers in LEO SatNets. This cross-layer design is import to LEO SatNets given that the network nodes are moving (i.e., the network topology is dynamic) and all links (with UTs, gateways, and other satellites) are wireless (radio frequency (RF) or FSO). This means that the design of the lower layers has a significant impact on the performance of the upper ones.

Figure 8A:
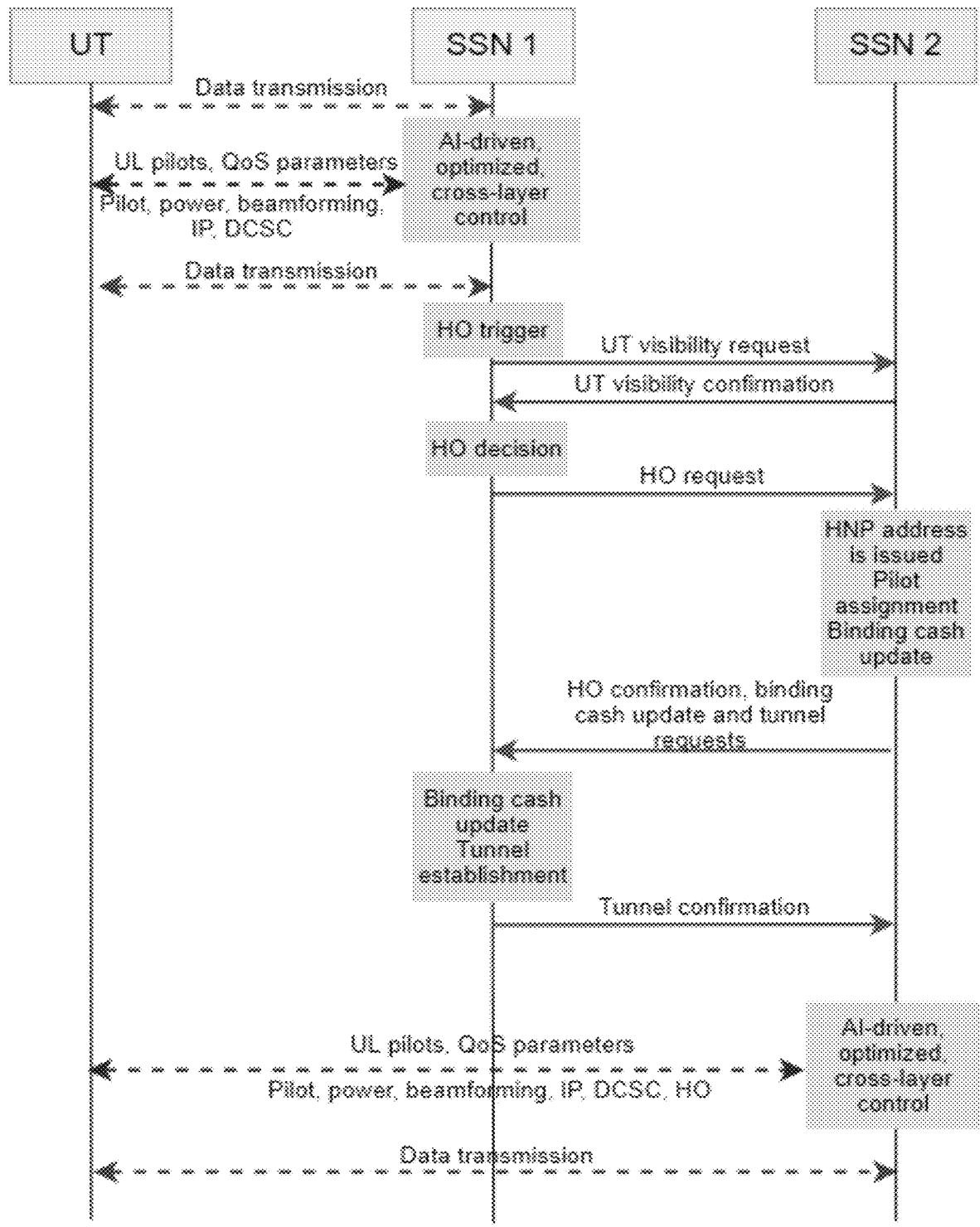
FIGS. 8A and 8B depict flow charts for a handover procedure according to embodiments of the invention wherein the handover is triggered and the visibility of the next cluster is confirmed.
Figure 8B:
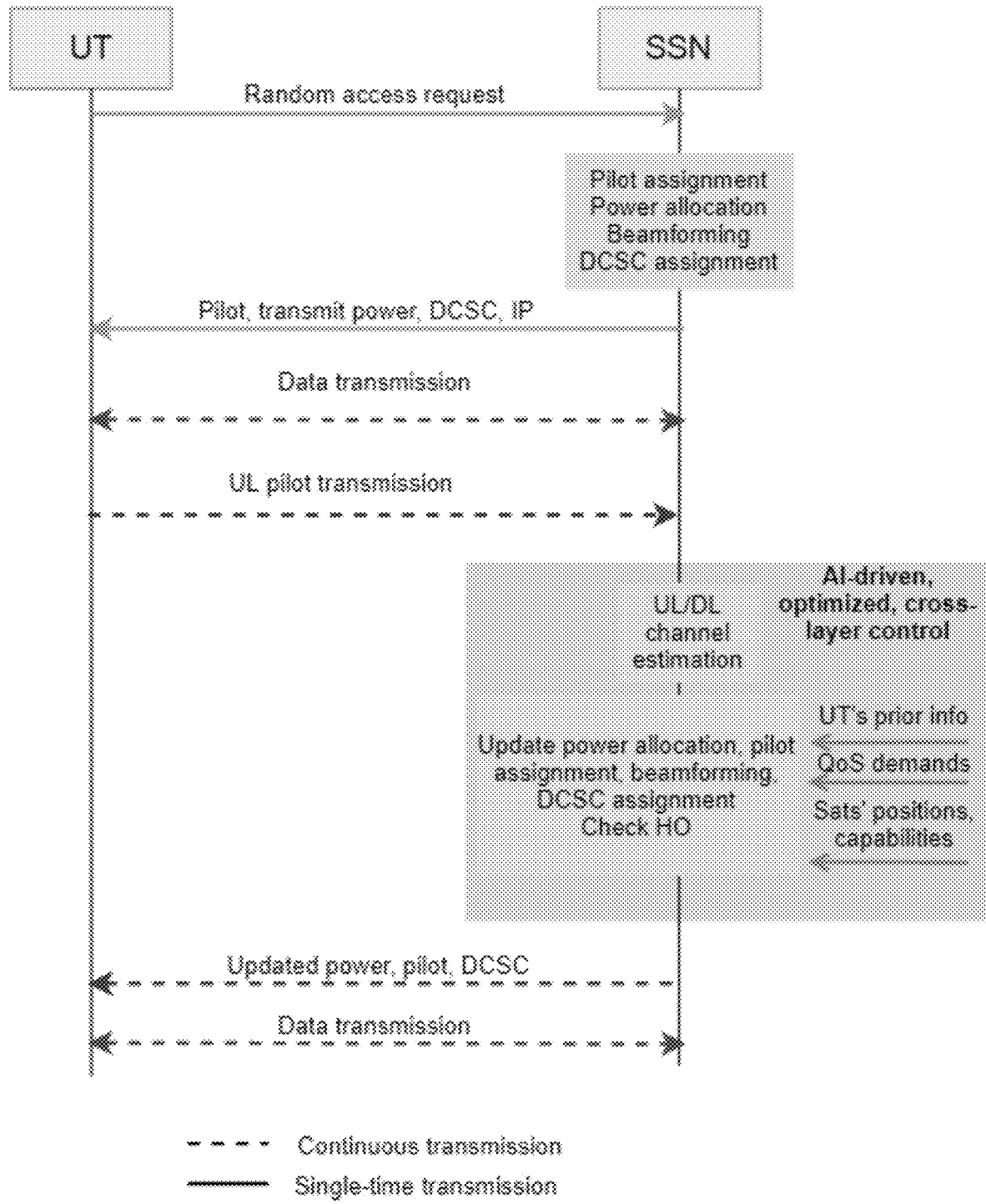

Referring to FIG. 8B there is depicted signaling between the UT and SSN to establish the link and to transmit/receive the data according to an embodiment of the invention. As seen in FIG. 8B, the cross-layer design can be utilized to update the power allocation, pilot assignment, beamforming, DCSC assignment, and handover decisions. Moreover, this cross-layer design can be driven by artificial intelligence (AI) to adapt to the channel conditions and satellites' positions utilizing prior network and users' information.

As outlined above the benefits of cross-layer design, joint optimization of the power allocation and handover management processes, result in increased spectral efficiency of the network and reduced the handover rate for the UTs utilizing the inventive DM-MIMO-based LEO SatNet Architecture. These improvements being evident in FIGS. 10 and 11, respectively.

2E: Multi-User and Single-User MIMO Modes

Figure 7:
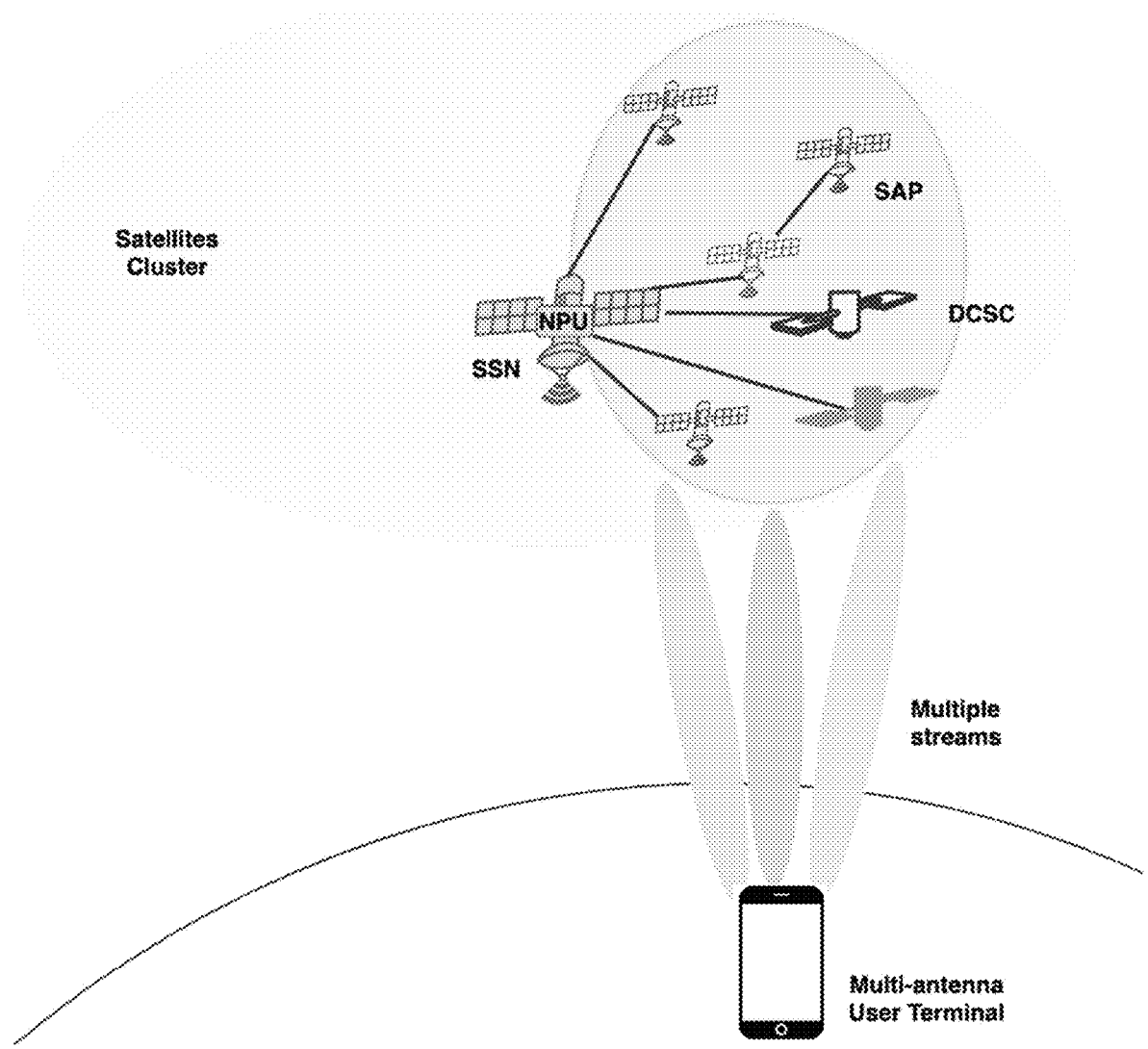
FIG. 7 depicts a schematic of a single-user MIMO mode within a DM-MIMO LEO SatNet according to an embodiment of the invention.

Exemplary embodiments of DM-MIMO-based LEO Sat-Nets can communicate with the UTs in multi-user MIMO (MU-MIMO) and single-user MIMO (SU-MIMO) modes. In the former, a cluster of satellites can communicate with multiple UTs on the same time-frequency resources achieving a multiplexing gain for the network to increase the capacity, as shown in FIG. 1. On the other hand, in the SU-MIMO mode can be utilized to serve a single UT (with multiple antennas) with several streams to improve its achievable data rate, as shown in FIG. 7.

2F: Other Multiplexing Techniques

Exemplary embodiments of DM-MIMO-based LEO Sat-Nets can exploit other multiplexing techniques, e.g., non-orthogonal multiple access (NOMA) and Rate-Splitting Multiple Access (RSMA), may be utilized in the proposed architecture to further utilize the radio resources by separating the signals in different domains (e.g., power domain).

2G: User Plane and Control Plane Separation

Figure 6:
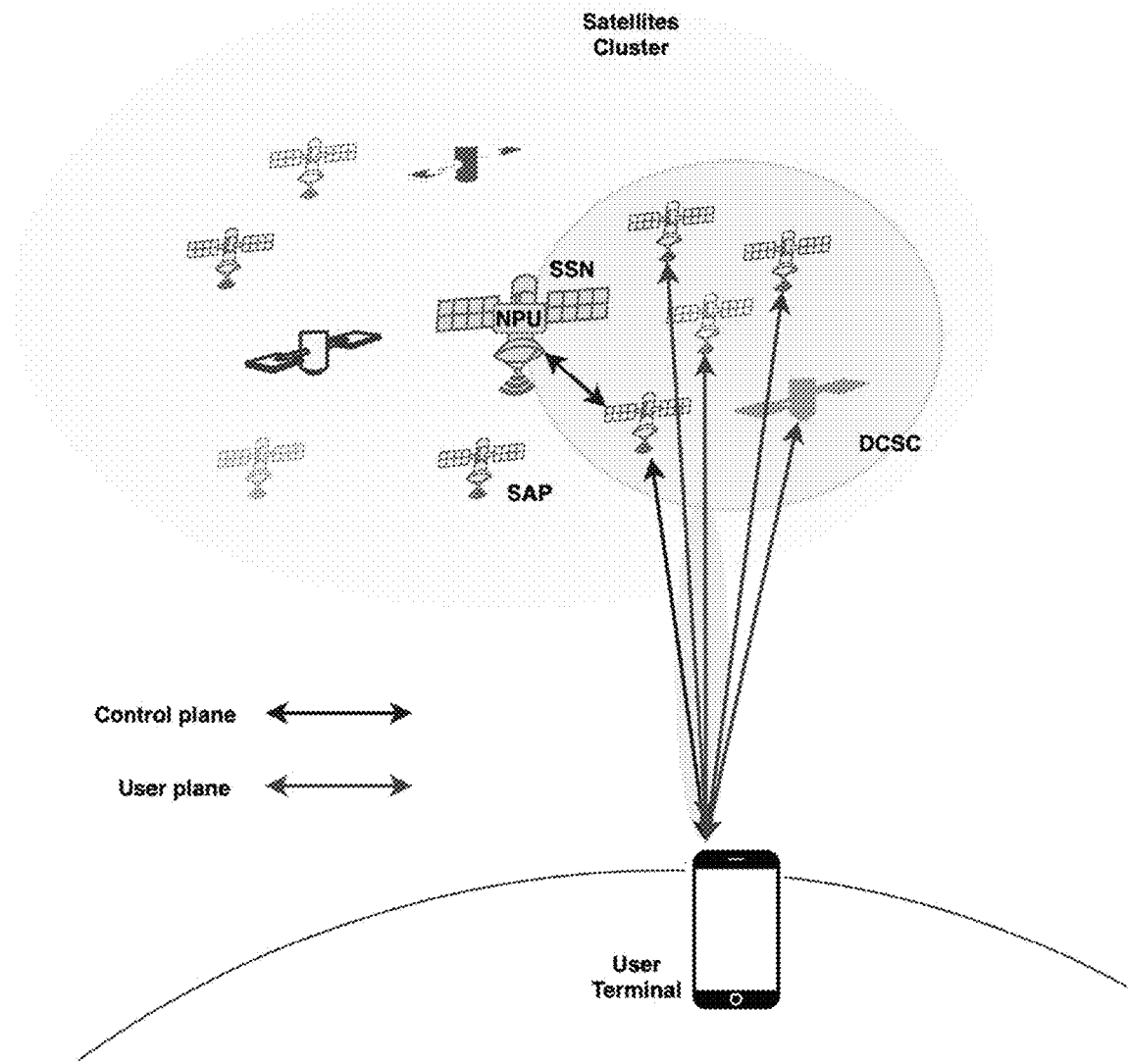
FIG. 6 depicts a schematic of a user plane—control plan separation within a DM-MIMO LEO SatNet according to an embodiment of the invention.

Exemplary embodiments of DM-MIMO-based LEO Sat-Nets can exploit user plane—control plane separation which can be realized in the proposed DM-MIMO-based satellite architecture by considering the SAPs as the data nodes and the SSN as the control node. Accordingly, the data nodes can be adjusted on the basis of traffic demand while the control plane is managed by the SSN, as shown in FIG. 6.

2H: Exemplary Process Flow for Handover

The link and network handover procedure for the proposed DM-MIMO may be implemented, within embodiments of the invention, with the process flows depicted in FIG. 8A and FIG. 8B. When a handover is triggered at the link level and the visibility of the UT by the next cluster is confirmed, a network handover procedure is implemented to create a tunnel between the old and new clusters. This allows the packets arriving for the UT with the old IP address to be directed to the new cluster. In addition, other link-layer procedures are implemented to assign a new pilot to the UT in the new cluster to resume the data transmission via that cluster of SAPs. The complete signal diagram is shown in FIGS. 8A and 8B, respectively.

Section 3. Cross-Layer Design Framework

For the cross-layer design of the power allocation and handover management processes in the proposed DM-MIMO based SatNet architecture according to embodiments of the invention, the inventors initially consider the channel model and estimation. The inventors then derive the achievable data rates and formulate the optimization problem. The frequently used symbols are summarized in Table 1 below.

TABLE 1

Symbols within Specification

| Symbol | Description |
| --- | --- |
| $\mathcal{K}$, $\mathcal{M}$ | Sets of UTs and SAPs, respectively |
| K, M | Cardinalities of $\mathcal{K}$, $\mathcal{M}$ respectively |
| $\tau_c$, $\tau_u^p$ | Length of coherence interval and UL pilot, respectively |
| $\tau_u^d$, $\tau_d^d$ | Length of UL and DL data transmissions, respectively |
| $q_k$, $p_{m,k}$ | UL pilot power and DL power factor of SAP m to UT k |
| $h_{m,k}$ | Channel coefficient between UT k and SAP m |
| $\hat{h}_{m,k}$ | Estimated channel coefficient between UT k and SAP m |
| $L_{m,k}$ | Large-scale fading and losses between UT k and SAP m |
| $R_k$ | Achievable DL data rate in bps/Hz for UT k |
| $R_k^{min}$ | Minimum rate of UT k in bps/Hz |
| $P_m^{max}$ | Maximum power factor of SAP m |
| $\alpha$ | Handover rate minimization priority factor |

3A. Channel Model

The inventors consider a cluster of LEO satellites that includes a set of M SAPs indexed by M={1, 2, . . . , m, . . . , M}. This cluster serves a set of single-antenna ground UTs set, indexed by K={1, 2, . . . , k, . . . , K}. The inventors assume that the channel conditions are static in a coherence time interval of $\tau_c$ samples. Due to the strong LoS component between the UTs and SAPs, the channel between the kth UT and the mth SAP is modelled as Rician and can be calculated by Equation (1A) where $k_{m,k}$ is the Rician K-factor, $h'_{m,k}$ and $h''_{m,k}$ represent the LoS and non-LoS (NLoS) components, respectively. The large scale signal fading and losses are represented by Equation (1B) where $L_{n,k}^{dist}$ is the power loss (in dB) due to distance between UT k and SAP m, $L_{n,k}^{shad} \sim \mathcal{N}(0, \sigma_{sh}^2)$ is the shadowing attenuation (in dB) with variance $\sigma_{sh}^2$, and $L_{n,k}^{angl}$ is the loss due to the boresight angle. This can be calculated (in dB) as given by Equation (2) where $\theta_{m,k}$ is the boresight angle between the kth UT and the mth SAP, and $\eta$ is the antenna factor determining the coverage radius, assuming that the aperture efficiency is unity.

$$h_{m,k} = \sqrt{L_{m,k}} \left( \sqrt{\frac{\mathcal{K}_{m,k}}{\mathcal{K}_{m,k}+1}} h'_{m,k} + \sqrt{\frac{1}{\mathcal{K}_{m,k}+1}} h''_{m,k} \right) \quad (1A)$$

$$L_{m,k} = 10^{-\left(L_{n,k}^{dist}+L_{n,k}^{shad}+L_{n,k}^{angl}\right)/10} \quad (1B)$$

$$L_{n,k}^{angl} = -10\log_{10}\left( \cos(\theta_{m,k}) \cdot \eta \cdot \frac{32\log 2}{2\left(2\arccos(\sqrt[\eta]{0.5})^2\right)} \right) \quad (2)$$

Suppose that the NLoS component, $h''_{m,k}$, is a Rayleigh random variable, i.e., $h''_{m,k} \sim \mathcal{CN}(0,1)$. The LoS component is given by $h'_{m,k} = e^{j\phi_{m,k}}$, where $\phi_{m,k} \sim \mathcal{U}[-\pi,\pi]$ is a uniform random variable that represents the phase shift due to the mobility of the SAP and UT and propagation delay.

For simplicity, we rewrite Equation (1) as Equation (3) where $\beta_{m,k}$ is given by Equation (4). In Equation (3), $\tilde{h}_{m,k} \sim \mathcal{CN}(0, \lambda_{m,k})$, $\lambda_{m,k} = L_{m,k}/(\mathcal{K}_{m,k}+1)$, and $\beta_{m,k} \in \mathbb{R}$. Therefore, $\beta_{m,k}$ and $\lambda_{m,k}$ are changing slowly and can be known a priori.

$$h_{m,k} = \sqrt{\beta_{m,k}} e^{j\phi_{m,k}} + \tilde{h}_{m,k} \quad (3)$$

$$\beta_{m,k} = \frac{\mathcal{K}_{m,k}}{\mathcal{K}_{m,k}+1} L_{m,k} \qquad (4)$$

3B. Uplink Training and Channel Estimation

As discussed above, TDD is used for communications with an exemplary frame structure as depicted in FIG. 4. Therefore, to estimate the UL channels at the SAPs, every UT transmits a pilot on the initial $\tau_u^p$ samples of the coherence block. Since the inventors assume that the number of UTs is larger than the number of mutual orthogonal pilots (i.e., $K > \tau_u^p$), every subset of UTs is assigned the same pilot. The subset of UTs that are assigned the same pilot as UT k is denoted by $\mathcal{C}_k$. Define $$\sqrt{q_k}\psi_k \in \mathbb{C}^{\tau_u^p+1}$$

as the $\tau_u^p$ length pilot sequence transmitted by the kth UT, where $q_k$ is the pilot power and $\psi_k^H \psi_k = \|\psi_k\|^2 = \tau_u^p$. Therefore, the received signal vector at the mth $$SAP, y_m^p \in \mathbb{C}^{\tau_u^p \times 1},$$

from all K UTs' pilot transmissions is given by Equation (5) where $$n_m^p \sim \mathcal{CN}(0_{\tau_u^p}, \sigma_{np}^2 I_{\tau_u^p})$$

is the additive white Gaussian noise (AWGN) vector. To estimate the UL channel of UT k, sufficient statistics are derived from the received signal by calculating the inner product between the received signal vector, $y_m^p$, and $\psi_k$, as given by Equations (6) and (7). This is because of the condition in Equation (8).

$$y_m^p = \sum_{k=1}^{K} \sqrt{q_k} h_{m,k} \psi_k + n_m^p \qquad (6)$$

$$y_{m,k}^p = \psi_k^H y_m^p = \sum_{k'=1}^{K} \sqrt{q_{k'}} h_{m,k'} \psi_k^H \psi_{k'} + \psi_k^H n_m^p =$$
$$\sqrt{q_k} \tau_u^p h_{m,k'} + \sum_{k' \in C_k \setminus \{k\}} \sqrt{q_{k'}} h_{m,k'} \tau_u^p + \psi_k^H n_m^p \qquad (7)$$

$$\psi_k^H \psi_{k'} = \begin{cases} \tau_u^p & k' \in C_k \\ 0 & \text{otherwise} \end{cases} \qquad (8)$$

This statistic can be used to estimate the UL channel, $h_{m,k}$, at the mth SAP using techniques such as minimum mean-square estimation (MMSE) and linear MMSE (LMMSE) estimators. The inventors assume that a phase aware MMSE channel estimator is used. Therefore, the estimated UL channel can be given accordingly by Equations (9)-(11) respectively with the statistics established by Equations (12) and (13) where $\mathbb{E}\{\bullet\}$, and $\text{Var}\{\bullet\}$ are the expectation and variance operators, respectively.

$$\hat{h}_{m,k} = \sqrt{\beta_{m,k}} e^{j\phi_{m,k}} + \frac{\sqrt{q_k} \lambda_{m,k}(y_{m,k}^p - \bar{y}_{m,k}^p)}{\gamma_{m,k}} \qquad (9)$$

$$\bar{y}_{m,k}^p = \sum_{k' \in C_k} \sqrt{q_{k'}} \tau_u^p \sqrt{\beta_{m,k'}} e^{j\phi_{m,k'}} \qquad (10)$$

$$\gamma_{m,k} = \sum_{k' \in C_k} q_{k'} \tau_u^p \lambda_{m,k'} + \sigma_{np}^2 \qquad (11)$$

$$\mathbb{E}\{\hat{h}_{m,k} | \phi_{m,k}\} = \sqrt{\beta_{m,k}} e^{j\phi_{m,k}} \qquad (12)$$

$$\text{Var}\{\hat{h}_{m,k} | \phi_{m,k}\} = \frac{q_{k'} \tau_u^p \lambda_{m,k}^2}{\gamma_{m,k}} \qquad (13)$$

3C. Downlink Data Transmission

Assuming that most of the traffic is in the DL direction, the inventors consider the DL power allocation and manage the handover process accordingly. In the DL, the SAPs transmit the same symbol to the UT in a cooperative manner. Assume that the symbol to be sent to UT k is $s_k \in \mathcal{C}$. Every symbol is precoded by a precoding vector $v_k = \{v_{1,k}, v_{2,k}, \ldots, v_{M,k}\}^T$, where $v_{m,k} \in \mathcal{C}$. Therefore, if the signal vector to be sent to the K UTs is $s_k = \{s_1, s_2, \ldots, s_K\}^T$, then the signal vector to be transmitted by the M SAPs is given thus by Equation (14) where $V = [v_1, v_2, \ldots, v_K]$ is an M×K matrix.

Therefore, the signal received by the kth UT can be calculated by Equations (15) and (16) respectively where $h_k = \{h_{1,k}, h_{2,k}, \ldots, h_{M,k}\}^T$ and $n_k \sim \mathcal{CN}(0, \sigma_n^2)$ is the AWGN noise. Therefore, the signal-to-interference and noise (SINR) can be calculated by Equation (17).

$$x = Vs = v_1 s_1 + v_2 s_2 + \ldots + v_K s_K \qquad (14)$$

$$y_k = h_k^H x \qquad (15)$$

$$= h_k^H v_k s_k + \sum_{k' \in \setminus k} h_k^H v_{k'} s_{k'} + n_k \qquad (16)$$

$$SINR_k = \frac{|\mathbb{E}\{v_k^H h_k\}|^2}{\sum_{k' \in \setminus k} \mathbb{E}\{|v_{k'}^H h_k|^2\} + \sigma_n^2} \qquad (17)$$

In this analysis of embodiments of the invention, the inventors adopt coherent beamforming as the technique used to minimize the interference between the UTs. Therefore, the precoding coefficient for the kth UT and mth SAP is $$v_m s_k = \sqrt{p_{m,k}} \hat{h}_{m,k},$$

where $p_{m,k}$ is a power scaling factor and $\hat{h}_{m,k}$ is the estimated UL channel, which is valid for the DL direction by virtue of channel reciprocity. That is, the precoding vector for the kth UT is given by Equation (18A) where are $P_k$ and $\hat{h}_k$ are given by Equations (18B) and (18C) respectively.

$$v_k = P_k^{1/2} \hat{h}_k \qquad (18A)$$

$$P_k = \text{diag}\left(\frac{p_{1,k}}{|\mathbb{E}\{|\hat{h}_{1,k}|\}|^2}, \frac{p_{2,k}}{|\mathbb{E}\{|\hat{h}_{2,k}|\}|^2}, \ldots, \frac{p_{M,k}}{|\mathbb{E}\{|\hat{h}_{M,k}|\}|^2}\right) \qquad (18B)$$

$$\hat{h}_k = [\hat{h}_{1,k}, \hat{h}_{1,k}, \ldots, \hat{h}_{1,k}]^T \qquad (18C)$$

Accordingly, by using coherent beamforming as defined by Equation (18A) with phase-aware MMSE channel estimation as in Equation (9), and the SINR in Equation (17), the achievable DL data rate (in bps/Hz) of the kth UT served by this cluster of SAPs can be calculated as given by Equation (19), where the terms are given by Equations (20)-(25) respectively.

$$R_k = \frac{\tau_d^d}{\tau_c}\log_2\left(1 + \frac{\left(\left|tr(P_k^{1/2}D_k)\right|^2\right)}{\left(\sum_{k'=1}^{K}tr(P_{k'}A_k'D_{k'}) + \sum_{k'\in C_k\setminus k}q_kq_{k'}(\tau_u^p)^2\left|tr(P_{k'}^{1/2}A_kG_{k'}A_{k'})\right|^2 - tr(P_kB_k^2) + \sigma_n^2\right)}\right) \quad (19)$$

$$A_k=\text{diag}(\lambda_{1,k},\lambda_{2,k},\ldots,\lambda_{M,k}) \quad (20)$$

$$A'_k=\text{diag}(\lambda'_{1,k},\lambda'_{2,k},\ldots,\lambda'_{M,k}) \quad (21)$$

$$\lambda'_{m,k}+\lambda_{m,k}=\beta_{m,k} \quad (22)$$

$$B_k=\text{diag}(\beta_{1,k},\beta_{2,k},\ldots,\beta_{M,k}) \quad (23)$$

$$D_k=q_k\tau_u^p A_k G_k A_k + B_k \quad (24)$$

$$G_k=\text{diag}(\gamma_{1,k},\gamma_{2,k},\ldots,\gamma_{M,k})^{-1} \quad (25)$$

3D. Cross-Layer Problem Formulation

To optimize the power allocation and the handover decisions such that the cluster throughput is maximized and the handover rate is minimized, the inventors formulate the power allocation and handover processes as a multi-objective optimization problem, where the objective functions to be maximized are the UTs' aggregate data rate and service time before being switched to another cluster. For the latter, the inventors maximize the number of served UTs with a guaranteed minimum data rate based on link conditions.

When the link condition does not allow optimized power allocation to serve the UT with the minimum required data rate, a handover request is issued. Then, a handover decision is taken when this repeats, and the visibility of the UT is confirmed by the next serving cluster, as discussed above in Section 2. That is, the objectives of the optimization problem at the ith time slot are given as follows in Equations (26) and (27) where $R_k[t]$ is the data rate of the kth UT during the tth time slot based on its channel conditions and power allocation during that time slot, as given in Equation (19). $I_k[t]$ is an indicator variable that indicates whether the kth UT can be served by the cluster during the tth time slot with an acceptable data rate, through optimizing the power allocation, or it is infeasible, and a handover might be considered.

$$\max_{p_{m,k},I_k}\sum_{k=1}^{K}R_k[t]I_k[t] \quad (26)$$

$$\max_{p_{m,k},I_k}\sum_{k=1}^{K}I_k[t] \quad (27)$$

In order to address this multi-objective optimization problem, the inventors construct a weighted sum of the two objectives to combine the two conflicting objectives into a single function. Thus, the complete handover-aware power allocation problem at time slot t is formulated as a series of constraints as given by Equations (28) to (28D) respectively where $\alpha$ is a weighting coefficient that combines the two competing objectives and can be used to prioritize them. That is, by setting $\alpha=0$, we target maximizing the aggregate UTs' data rate only, and by setting $\alpha=1$, we target minimizing the handover rate only.

A constraint, Equation (28A), is used to ensure that the served UTs satisfy a minimum rate level, where $R_k^{min}$ is the required minimum rate of UT k. Another constraint, Equation (28C), is expressed to ensure that the total power scaling factors of every SAP are within the required range, where $P_m^{max}$ is the maximum total value for the mth SAP. The binary value of the indicator variable, $I_k[t]$, and the non-negative value of $p_{u,k}$ are imposed by a further pair of constraints, Equations (28B) and (28D), respectively.

$$\max_{p_{m,k},I_k}(1-\alpha)\sum_{k=1}^{K}R_k[t]I_k[t] + \alpha\sum_{k=1}^{K}I_k[t] \quad (28)$$

$$\text{s.t. } R_k[t] \geq R_k^{min}I_k[t], \quad \forall\, m \in \mathcal{K} \quad (28A)$$

$$I_k[t] \in \{0,1\}, \quad \forall\, m \in \mathcal{K} \quad (28B)$$

$$\sum_{k=1}^{K}p_{m,k} \leq P_m^{max}, \quad \forall\, m \in \mathcal{M} \quad (28C)$$

$$p_{m,k} \geq 0, \quad \forall\, m \in \mathcal{M},\, k \in \mathcal{K} \quad (28D)$$

This optimization problem can be modelled as a mixed integer non-linear program (MINLP), which is generally non-deterministic polynomial-time hard (NP-hard) due to its combinatorial behaviour. Therefore, exponential computational complexity is required to solve this problem. This means that solving this problem optimally with available computing resources and technology cannot be undertaken in real-time. Accordingly, in the next section, the inventors leverage deep learning techniques to build a model that can predict efficient solutions to this problem in a computationally efficient manner. However, it would be evident that other models and/or AI processes and/or ML processes may be employed to establish solutions to this problem in a computationally efficient manner without departing from the scope of the invention.

4. AI-Based Solution

In this section, the inventors outline an approach utilizing data-driven techniques to implement the cross-layer control designed in Section 3. For this purpose, deep learning positions is one of the most efficient machine learning techniques, since it provides multi-layered models that are capable of learning efficient data representations from unstructured, complex datasets.

Therefore, considering the optimized solution of the problem in Equation (28) as the output of a certain mapping function, $f(\bullet)$, that maps the input of the optimization problem (i.e., user channel coefficients and QoS parameters), the inventors design a deep neural network (DNN) model that can "learn" this mapping function utilizing labelled training examples. For the latter, the inventors use the traditional mathematical optimization tools to solve the problem in Equation (28) offline for different inputs and use it as the desired output of the DNN model. In doing so, the inventors move the complexity of solving the optimization problem offline. The inventors then used the "trained" DNN model to predict the optimized solution for new inputs without the need to mathematically solve the optimization problem again for the new inputs. It is worth noting that a trained DNN model can predict the output with much lower complexity compared to solving the optimization problem, since it is mainly executed as a multiplication of matrices, as will be discussed in the sequel.

We determine the input and output vectors of the optimization problem in Equation (28) as follows. The input vector is $x \in \mathbb{R}^{U_O}$, $U_O=MK+K+M$, and is given according to Equation (29).

$$x = \left[\{L_{m,k}\}_{m=1,k=1}^{m=M,k=K}, \{R_k^{min}\}_{k=1}^{K}, \{P_m^{max}L_{m,k}\}_{m=1}^{M}\right]^T \quad (29)$$

This input is used by the DNN model to predict the desired output of the optimization problem, which is $x \in \mathbb{R}^{U_E}$, $U_E = MK+K$, and is calculated as per Equations (30) and (31) where $f(\bullet)$ is the function that represents the mapping process of the optimization problem in Equation (28), and $p_{m,k}^*$ and $I_k^*$ are the desired values of power allocation and handover indicator, respectively. Therefore, the output of the DNN model is the predicted value for this desired vector, z. That is, $\hat{z} = \hat{f}(x)$ where $\hat{f}(\bullet)$ is the approximated mapping function.

$$z = f(x) \quad (30)$$

$$= \left[\{p_{m,k}^*\}_{m=1,k=1}^{m=M,k=K}, \{I_k^*\}_{k=1}^{K}\right] \quad (31)$$

$$z^{(e)} = g^{(e)}(W^{(e)}z^{(e-1)} + b^{(e)}) \quad (32)$$

Figure 9:
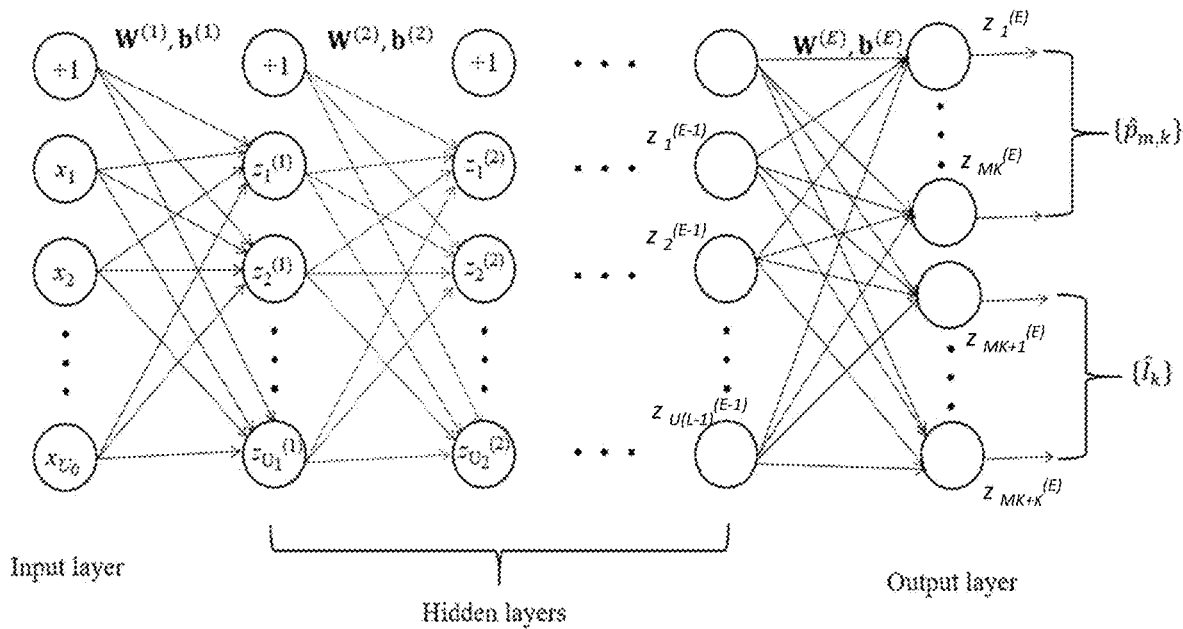
FIG. 9 depicts a deep neural network (DNN) model adopted for predicting an optimized solution for new inputs to a DM-MIMO based LEO SatNet according to embodiments of the invention.

The adopted DNN model is shown in FIG. 9. The DNN model is composed of E layers that include an output layer and E−1 hidden layers. Each layer has a number of neurons or units. Assume that the eth layer incorporates $U_e$ units. The output of the DNN model, $\hat{z}$, can be calculated using a multilayered matrix multiplication process. That is, the output of the eth layer can be calculated as defined in Equation (32) where $z^{(e)}$ is the output of the eth layer (i.e., $\hat{z} = z^{(E)}$ and $g^{(e)}(\bullet)$ is the activation function that maps the output of the previous layer to the input of the subsequent one.

In addition to the activation function, the parameters $b^{(e)}$ and $W^{(e)}$ are used to calculate the input of the activation function based on the output of the previous layer, where $b^{(e)} \in \mathbb{R}^{U_w}$ is the bias vector of the eth layer and $W^{(e)} \in \mathbb{R}^{U_e \times U_{e-1}}$ is its weights matrix such that w is the weight of the edge from the jth unit in layer e−1 to the ith unit in layer e. These parameters ($b^{(e)}$ and $W^{(e)}$) are optimized to provide accurate predictions for the desired output vector. This optimization process is implemented during the training phase.

To train the DNN model (i.e., to optimize $b^{(e)}$ and $W^{(e)}$), a labelled dataset is constructed by using the optimal solution of the optimization problem in Equation (28) at different inputs. It is worth mentioning that, alternatively, a suboptimal solution can be used, in case the optimal solution is too expensive to calculate. However, the DNN model would mimic the suboptimal procedure. Assume that the training set is composed of T tuples $\{(x^{\{1\}}, z^{\{1\}}), (x^{\{2\}}, z^{\{2\}}), (x^{\{3\}}, z^{\{3\}}), \ldots, (x^{\{T\}}, z^{\{T\}})\}$.

Therefore, the DNN model is trained by solving the unconstrained optimization problem given by Equation (33) where $\mathcal{L}(\bullet)$ is a loss function that is selected to represent the error between the prediction and the ground truth of the training examples. After the training phase, the DNN model is ready to provide efficient predictions for the optimized power allocation and handover indicator online.

$$\min_{\{W^{(e)}\}, \{b^{(e)}\}} \frac{1}{T} \sum_{i=1}^{T} \mathcal{L}(z^{\{i\}}, \hat{z}^{\{i\}}) \quad (33)$$

4A. Complexity Analysis

During online operation, the DNN model calculates predictions for the desired output vector for the input values based on the experience gained in the training phase. For this purpose, the output of each layer is calculated as in Equation (32). Therefore, the computational complexity to calculate z(e) is due to the multiplication operation and the activation function Using the big-O notation, this computational complexity is in the order of $\mathcal{O}(U_e U_{e-1} + U_e) = \mathcal{O}(U_e U_{e-1})$. Therefore, the complexity of calculating the output of the DNN model is $\sum_{e=1}^{E} \mathcal{O}(U_e U_{e-1})$.

For example, if two hidden layers are used, and each layer has the same number of units as the input, then the computational complexity can be calculated via Equation (34) to (37) respectively.

$$\sum_{1}^{3} \mathcal{O}(U_e U_{e-1}) = \mathcal{O}(U_0^2) + \mathcal{O}(U_0^2) + \mathcal{O}(U_0 U_E) \quad (34)$$

$$= \mathcal{O}(U_0^2) + \mathcal{O}(U_0 U_E) \quad (35)$$

$$= \mathcal{O}((MK + K + M)^2) + \mathcal{O}((MK + K + M)(MK + K)) \quad (36)$$

$$= \mathcal{O}(M^2 K^2) \quad (37)$$

This is much lower than the exponential complexity of solving an NP-hard problem, such as (28). In addition, other benefits of using machine learning-based techniques are utilized, such as adaptability to the dynamics of the satellite link and topology, scalability, and support of distributed data processing and storage.

5. Simulation Results

The inventors within this section present and discuss the simulation results to evaluate the performance of the proposed inventive DM-MIMO based architecture with optimized cross-layer design and AI-based implementation. In addition, the inventors compare the performance with that of baseline techniques from the literature.

The inventors consider a set of M-LEO satellites that serves a set of UTs distributed uniformly over a 1,000×1,000 km² area. The values of the adopted simulation parameters are summarized in Table II. For the proposed D-JPAHM approach, this set of satellites is considered a cluster of SAPs, and each UT is connected to the whole cluster in a DM-MIMO manner. The NPU directs the UTs' downlink data to the SAPs and determines the power allocation for each SAP-UT link according to the optimization problem in Equation (28). To solve this optimization problem, the inventors use MATLAB's Genetic algorithm (GA) solver. As a baseline, the inventors compare the proposed DM-MIMO-based architecture with traditional single-satellite connectivity.

TABLE 2

| Simulation Parameters | |
|---|---|
| Parameter | Value |
| Satellite altitude | 550 km |
| Antenna factor (τ) | 20 |
| Carrier frequency | 30 GHz |
| Shadowing std | 5 dB |
| Noise figure | 7 dB |
| Noise power spectral density | −174 dbm/Hz |
| Satellite maximum power ($P_m^{max}$) | 15 dBW |
| Satellite antenna gain | 30 dB |
| UT antenna gain | 5 dB |

TABLE 2-continued

Simulation Parameters

| Parameter | Value |
|---|---|
| Pilot power ($q_k$) | 5 dBW |
| Coherence intervals: $\tau_c, \tau_u^p$ | 300, 30 samples |
| Number of runs | 10 |
| Priority factor ($\alpha$) | 0.5 |

For the handover scheme, the inventors consider two techniques. In the first scheme, each UT connects to the LEO satellite with the best channel condition and switches to a different one when the new satellite has a better link condition. This approach maximizes the throughput of each UT and is referred to as BestChannel. In the second single satellite connectivity technique, each UT remains connected to the LEO satellite in its visibility as long as its achievable rate is higher than the minimum acceptable value $R_k^{min}$. When this minimum value cannot be achieved by the current satellite connection, the UT switches to the best channel LEO satellite. This technique maximizes the service time for each UT (i.e., minimizes its handover rate) and is referred to as MaxServTime.

Figure 11:
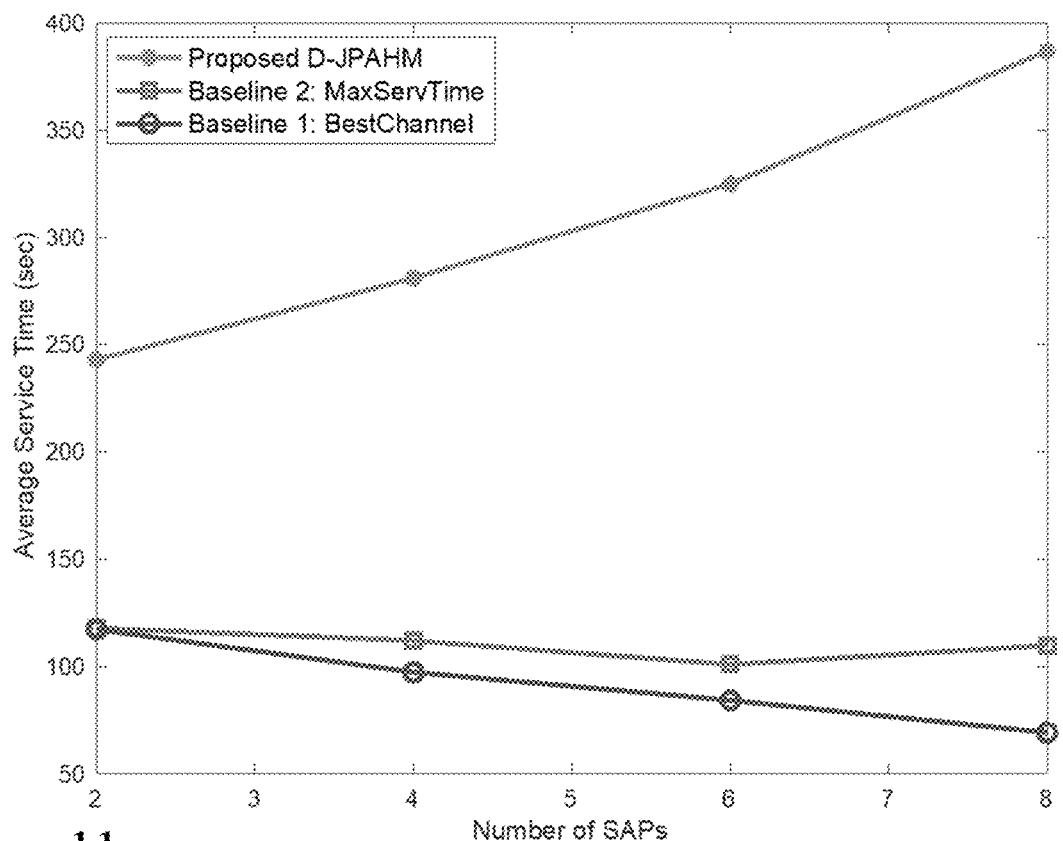
FIG. 11 depicts an average service time of the UTs within the simulated DM-MIMO based LEO SatNet according to an embodiment of the invention.

The average service time of the UTs is plotted against the number of satellites, M, using the three techniques in FIG. 11. As we can see, the MaxServTime technique achieves higher service time than BestChannel, which is as we would expect since MaxServTime prioritizes the longer service time, not the achievable data rate. However, the proposed D-JPAHM approach achieves a much higher value given that the visibility of a cluster of satellites is always longer than that of a single satellite. Therefore, the average service time increases with the increasing number of SAPs in the cluster.

Figure 10:
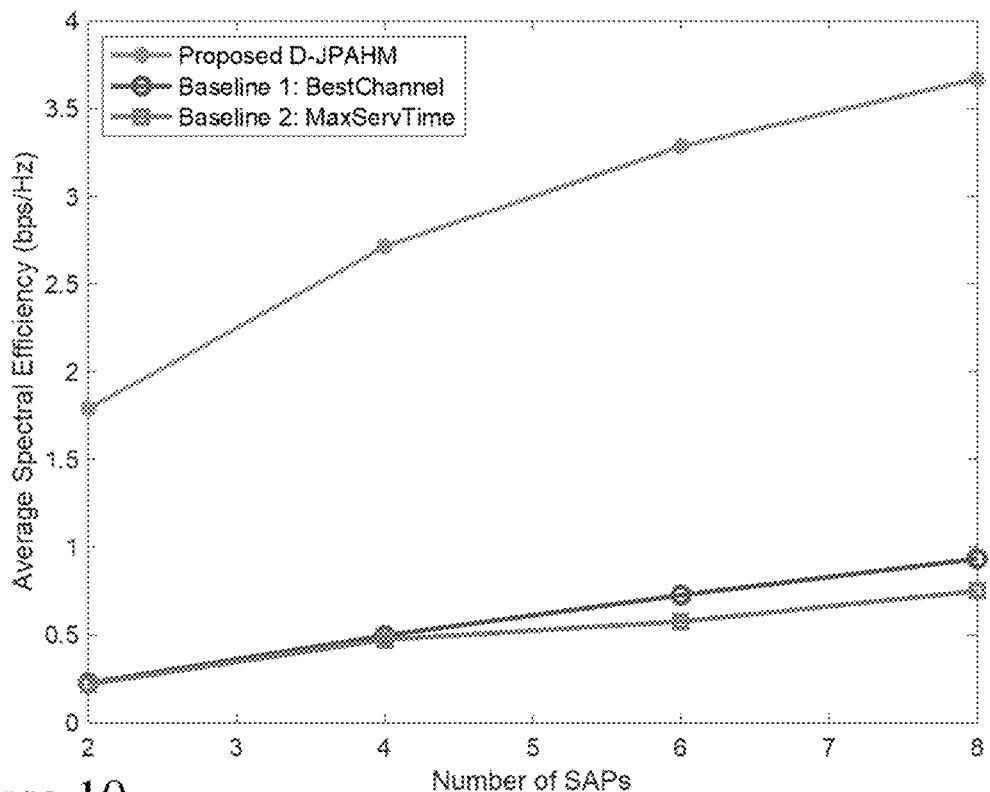
FIG. 10 depicts an average spectral efficiency for user terminals (UTs) within the simulated DM-MIMO based LEO SatNet according to an embodiment of the invention.

FIG. 10 shows the average spectral efficiency (in bps/Hz) versus the number of SAPs using the three approaches. As we can see, the cooperative transmission, full frequency reuse, and optimized power allocation of the DM-MIMO-based architecture improved spectral efficiency and outperformed conventional single-satellite connectivity techniques. Furthermore, this spectral efficiency gain increases with the number of SAPs. Although BestChannel prioritizes spectral efficiency, it could not compete with the DM-MIMO architecture, as shown in FIG. 11.

To evaluate the accuracy of the proposed DNN model discussed in Section 4, we generated a dataset with simulations that are implemented in MATLAB. The inventors simulated a cluster of four satellites that served a set of six UTs, which were uniformly distributed in the service area, and the positions were changed randomly at each simulation run to generate a total of 33,000 samples of channel realizations for the UTs. The simulation parameters are summarized in Table 2. Given the channel conditions of the UTs at every time instant, the optimization problem in Equation (28) was solved using MATLAB's GA solver to construct the input and corresponding output of the dataset, as discussed in Section 4. This dataset was then used for the training and testing of the DNN model.

The DNN model was implemented and evaluated using TensorFlow (free and open-source software library for machine learning and artificial intelligence) on the Python programming language using the Scikit-learn library (also known as Sklearn). The DNN model parameters are summarized in Table 3. To evaluate the accuracy of the predictions of the DNN model, the inventors used the mean squared error (MSE) of the predicted power allocation (normalized to Pmax m) and the F1 score for the prediction of the handover indicator. The F1 score is an efficient metric that is used widely in data science and binary classification problems. The F1 score can be calculated using the following expression in Equation (38) where Precision and Recall are defined by Equations (39) and (40) respectively.

$$F1 \text{ Score} = \frac{2 \times \text{Precision} \times \text{Recall}}{\text{Precision} + \text{Recall}} \quad (38)$$

$$\text{Precision} = \frac{\text{True Positives}}{\text{True Positives} + \text{False Positives}} \quad (39)$$

$$\text{Recall} = \frac{\text{True Positives}}{\text{True Positives} + \text{False Nagatives}} \quad (40)$$

TABLE 3

DNN Model Parameters

| Parameter | Value |
|---|---|
| Dataset size | 33,000 samples |
| Training dataset percentage | 70% |
| Optimizer | Adam (learning rate = 0.01) |
| Batch size | 32 |
| Number of hidden layers | 2 |
| Number of units per layer | 40, 50 |
| Active functions | Hard-sigmoid |
| Loss functions | MSE, Binary Cross-entropy |
| Training epochs | 50 |

Figure 12:
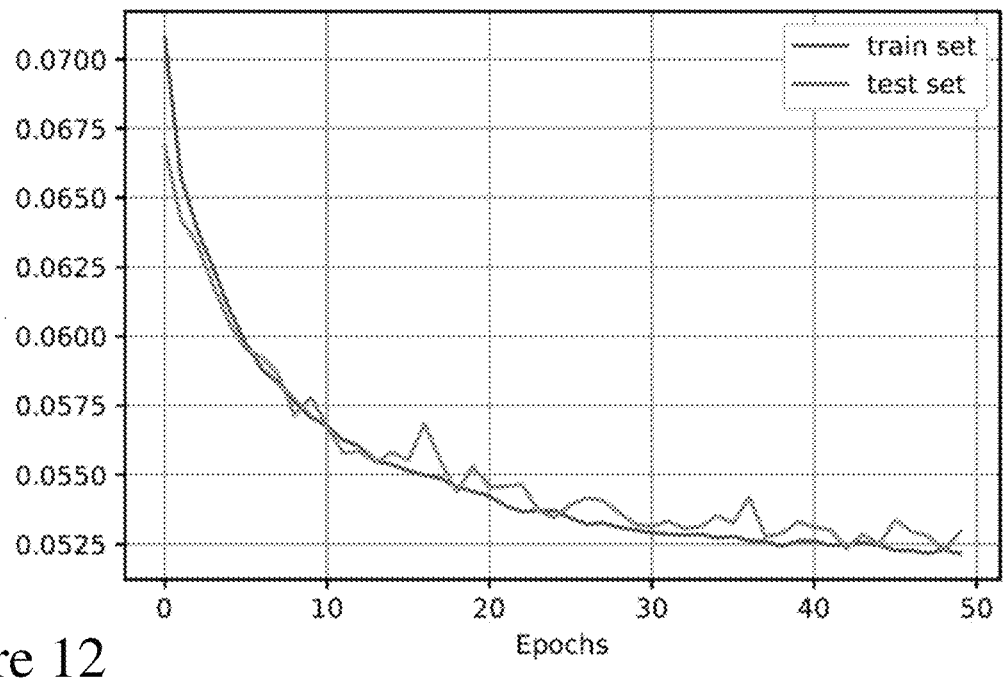
FIG. 12 depicts the mean squared error of the power allocation prediction from the training set and test data set of the DNN model for a DM-MIMO based LEO SatNet according to embodiments of the invention.

FIG. 12 shows the MSE of the predicted power allocation $\{\hat{p}_{m,k}\}$ (normalized to Pmax) versus the number of training epochs to represent the learning curve of the DNN model. This was plotted for both the training and testing datasets. As we can see, the predictions achieved a high accuracy compared to the optimized solutions at the end of the training process. In addition, the gap between the testing and training MSE was small, which means that there is no overfitting problem in this DNN model.

Figure 13A:
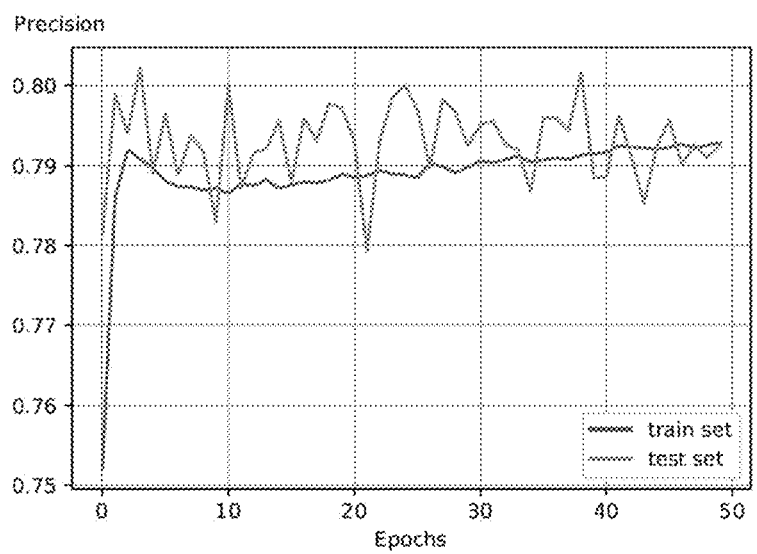
FIGS. 13A-13C depict handover indicator prediction accuracy from the DNN model for a DM-MIMO based LEO SatNet according to embodiments of the invention.
Figure 13B:
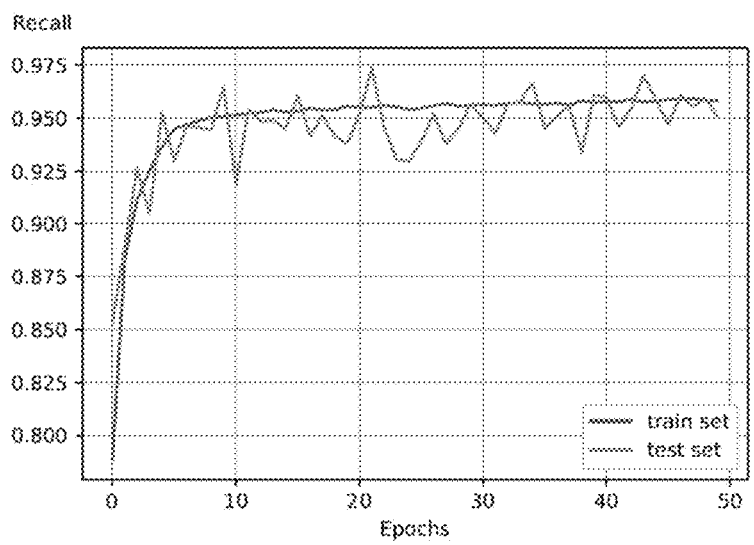
Figure 13C:
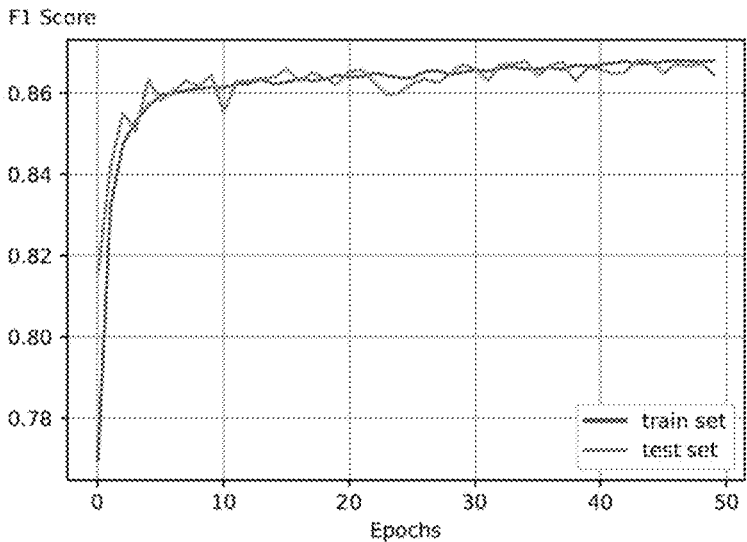

Similarly, the Precision, Recall, and F1 score of the predicted handover indicator, $\{\hat{I}_k\}$, were plotted against the training epochs in FIG. 13 to evaluate the accuracy of the prediction. Again, the DNN model achieved accurate predictions for the handover process. Therefore, this shows that the DNN model can effectively mimic the implicit mapping function of the optimized cross-layer design developed in Section III. However, it operates online with lower complexity compared to that of solving the NP-hard problem in Equation (28) using traditional mathematical optimization techniques. This means that the proposed distributed, optimized cross-layer design can be executed in practice utilizing deep learning techniques.

6. Summary and Extensions/Variants etc.

Accordingly, the inventors have described above the underlying concepts behind their novel DM-MIMO-based LEO satellite network architecture and discussed its various design aspects. Based on the proposed architecture, the inventors have also established a novel optimized cross-layer control framework, where the power allocation and handover management processes were jointly optimized. In addition, the inventors introduced an AI-based implementation suitable for real-time operation and the dynamic environment of the LEO satellite network as one solution to the computing complexity of this dual optimization problem. As described above, simulation results demonstrate that the proposed novel DM-MIMO-based architecture achieves improved spectral efficiency for the network than baseline techniques and reduces the handover rate of the user terminals, exploiting the ultra-dense deployment of the LEO satellites. Moreover, the results show that the exemplary deep learning-based implementation can predict efficient and accurate solutions for the proposed optimization framework.

By exploiting distributed massive multiple-input multiple-output (DM-MIMO) that build upon coordinated multi-point (CoMP) and network MIMO techniques for large spectral efficiency, power efficiency, and network flexibility gains the inventors have established a novel architecture for UTs to communicate with clusters of satellites. Within these inventive DM-MIMO LEO SatNets multiple access points can be used to cooperatively communicate with users in a distributed manner. By exploiting an ultra-dense deployment of LEO satellite with very high-speed ISLs, and line-of-sight (LoS) connections with ground UTs the inventors provide networks with reduced handovers, increased resilience, and improved performance.

6.1 Routing

It is projected that future LEO constellations will encompass thousands of satellites based upon currently announced plans and probable projections. Accordingly, packet routing strategies at the level of individual satellites can be very challenging due to the large number of network nodes with changing topology. However, routing at the level of clusters of satellites, which utilizes the proposed DM-MIMO-based architecture according to embodiments of the invention provide a methodology to overcome this scalability issue. Referring to FIG. 14 there is depicted schematically the concept of satellite cluster routing.

7. Benefits of the Technology 7.1 Handheld Device Connectivity

The proposed DM-MIMO-based architecture according to embodiments of the invention provides for systems exploiting LEO satellites to provide improved services and connectivity. Further, the ability to leverage clusters of LEO satellites offers a system providing satellite based broadband connectivity to handheld devices where a challenging issue in satellite communications is the link budget due to the altitude of the satellites. Prior art satellite communications exploits high-gain, big dish antennas for the UTs and satellites to compensate for the distance-based path losses increasing the cost of the UT equipment and making it cumbersome due to the required large antenna design and does not allow broadband connectivity to handheld devices. However, the cooperative transmission/reception and full frequency reuse of the proposed DM-MIMO based satellite network architecture according to embodiments of the invention can be utilized to compensate for the low-gain antennas at the user side by operating in the SU-MIMO mode, as shown in FIG. 7. Accordingly, the cost of UT equipment can be decreased, and the network broadband connectivity can be extended to handheld devices. This gain of SU-MIMO could not be achieved by deploying multiple antennas on the same LEO satellite. This is because the multiple streams could not be sufficiently separated at the UT as the satellite channel is dominated by its LoS component. This means that to have an acceptable MIMO gain of this configuration, the antennas should be separated on the ground by a certain distance. However, as the proposed architecture adopts MIMO transmission in a distributed manner (i.e., utilizing several satellites), a SU-MIMO gain can be achieved.

7.2 Lower Handover Frequency

In the proposed DM-MIMO-based architecture according to embodiments of the invention, the NPU assigns a subset (referred to above as a DCSC) of the SAPs in the cluster to serve the ground UT in a cooperative manner (see FIG. 1). This DCSC is dynamically changed based on the UT and SAPs' positions and channel conditions without the need to switch the ground UT to a new home network, i.e., the UT uses the same IP address in the new DCSC. Accordingly, a handover is required when the UT is served by a different SSN and SAPs cluster only (see FIG. 5B). Therefore, the service time is extended to the visibility of a cluster of satellites instead of a single satellite. This can reduce the handover rate to a large extent because the improvement in service time increases with the increase of the number of the included SAPs in the cluster.

In addition, this architecture enables the cross-layer design to optimize the lower and upper layers of communications jointly. For example, the power allocation and beamforming can be adjusted to increase the UTs' service time even more by exploiting the spatial degrees of freedom, as shown in FIG. 7. Consequently, this reduces the issues associated with high handover rate, such as signaling overhead, processing delay, data forwarding, tunnelling, IP addressing issues, location update, among others.

7.3. Scalability Support

In the proposed DM-MIMO-based architecture according to embodiments of the invention, satellites can join and leave the cluster by means of cluster entering/exit signaling between the satellite and the SSN, as shown in FIG. 2. New satellites increase the number of SAPs in the cluster and improve the system performance and vice versa. Therefore, the architecture supports changes and scalability of the satellite constellation. In addition, based on the proposed architecture, the satellite network is broken down into clusters of satellites instead of considering each satellite as a network node. This improves the performance of the satellite network management techniques (e.g., routing as in FIG. 14) given that the LEO constellations are anticipated to encompass tens of thousands of satellites.

7.4. Interoperability Support

Due to the costs and time of manufacturing and launching of the LEO satellites, it takes operators a long time to build their own constellation and to be able to serve the customers with the desired quality of service (QoS). However, utilizing DM-MIMO-based architectures according to embodiments of the invention interoperability among different operators enables the operators to utilize other constellations and be able to serve their customers in a reasonable time efficiently and with improved reliability. When an SSN identifies a candidate satellite (from a different constellation) that can serve as an SAP in the cluster, it can establish a cooperation link with that satellite and direct the data to be sent to ground users to it, along with the other SAPs in the cluster, as shown in FIG. 3. After that, the cooperation ends when that satellite is too far from the SSN and cluster adjusts. Accordingly, the SAPs within a cluster may be viewed as being established in some embodiments of the invention on an ad-hoc basis particularly where the orbits of the SAPs are at different altitudes, for example, so that their orbits are faster and/or on different trajectories to other members of the cluster.

7.5 Flexible Configuration and Reconfigurability

DM-MIMO-based architectures according to embodiments of the invention may employ software-defined networking (SDN) controllers within the SSNs. Therefore, the functionalities of the NPUs can be configured/reconfigured from the ground by means of a software update or upgrade without any hardware modification. Further, the DM-MIMO-based architecture according to embodiments of the invention supports the concept of user plane—control plane separation. This is because the SAPs represent the data plane nodes that scale based on the data traffic, and the NPU incorporates the control plane functions, as shown in FIG. 6. For instance, when the amount of data traffic served by a cluster increases, the number of SAPs in this cluster can be increased to support the traffic load during this time without the need to add more control functionalities.

7.6 Lower Constellation Deployment Costs

In the proposed DM-MIMO-based architecture, not all the constellation satellites are required to have the same advanced capabilities. Only a portion of the satellites are required to provide the NPUs of the DM-MIMO; and hence, form part of satellites with increased complexity. Accordingly, the majority of the constellation satellites can simply serve as slave nodes (see FIG. 1). Accordingly, only a portion of the SAPs require the NPU functionality to function as SSNs thereby reducing the requirements for deploying expensive equipment on all SAPs thereby contributing to decreasing the costs of building LEO mega-constellations.

However, it would be evident within other embodiments of the invention by exploiting high sped ISLs between satellites that the NPU may be distributed. Within other embodiments of the invention all satellites or a large portion of the satellites may contain sufficient processing/memory to support the NPU functionality such that increased flexibility in the assignment of an SAP as an SSN occurs and/or the SSNs may be dynamically assigned or assigned on ad-hoc basis in dependence upon one or more factors including, but not limited to, the UTs, SAPs, traffic load, ISLs etc.

Optionally, within embodiments of the invention an SSN may provide solely this functionality and not provide SAP functionality to UTs while within other embodiments of the invention a satellite may be an SSN and SAP concurrently or swap between these modes depending upon whether it is assigned to being an SSN or not.

While within the foregoing description a UT has been described as ground based it would be evident that the UT may be fixed in position or mobile in location. Further, the UT may be capable of non-ground based motion such as the UT forms part of a drone, aircraft, balloon, etc.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in several ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a central processing unit, a graphics-processing unit, and a programmable digital signal processing (DSP) unit. The processing system further may include a memory subsystem including main RAM and/or a static RAM, and/or ROM. A bus subsystem may be included for communicating between the components.

The memory includes machine-readable code segments (e.g., software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A communications network comprising:
   a) a plurality of satellites, each satellite providing a satellite access point (SAP); and
   b) a plurality of super satellite nodes (SSNs), each SSN comprising a network processing unit (NPU); wherein each SSN establishes a cluster with a defined subset of the plurality of satellites; and
   the cluster communicates with a user terminal (UT); wherein
   the NPU:
   c) manages communications with the UT;
   d) manages communications with the defined subset of the plurality of satellites associated with the SSN of which it forms part; and
   e) manages communications to another NPU within another SSN to establish a handover of communications with the UT from the cluster to which the NPU is associated to another cluster associated with the another SSN.

2. The communications network according to claim 1, wherein
   the defined subset of the plurality of satellites within the cluster associated with an SSN are dynamically assigned or assigned on an ad-hoc basis.

3. The communications network according to claim 1, wherein
   the UT comprises multiple antennas, and each antenna of the UT communicates with a different SAP within the cluster communicating with it.

4. The communications network according to claim 1, wherein
   a defined subset of the SAPs within the cluster concurrently communicate with the UT.

5. A method of communicating with a user terminal (UT) comprising:
   providing a cluster communicating with the UT; and
   providing another cluster communicating with the UT; wherein
   the cluster comprises a super satellite node (SSN) of a plurality of SSNs and a defined subset of a plurality of satellites each providing a satellite access point (SAP);
   the another cluster comprises another SSN of the plurality of SSNs and another defined subset of the plurality of satellites each providing a satellite access point (SAP);
   each SSN comprises a network processing unit (NPU) and establishes its own cluster; and
   the NPU of the SSN and the another SSN handle link and network handover for the UT from the cluster to the another cluster.

6. The method according to claim 5, wherein
   the defined subset of the plurality of satellites within the cluster associated with an SSN are dynamically assigned or assigned on an ad-hoc basis.

7. The method according to claim 5, wherein
   the NPU:
   a) manages communications with the UT;
   b) manages communications with the defined subset of the plurality of satellites associated with the SSN of which it forms part; and
   c) manages communications to another NPU within another SSN to establish a handover of communications with the UT from the cluster to which the NPU is associated to another cluster associated with the another SSN.

8. The method according to claim 5, wherein
   the UT comprises multiple antennas, and each antenna of the UT communicates with a different SAP within the cluster communicating with it.

9. A method of communicating with a user terminal (UT) comprising communicating with a cluster with the UT; wherein
   the cluster comprises a super satellite node (SSN) of a plurality of SSNs and a defined subset of a plurality of satellites each providing a satellite access point (SAP); and each SSN comprises a network processing unit (NPU) and establishes its own cluster; wherein
the NPU:
  a) manages communications with the UT;
  b) manages communications with the defined subset of the plurality of satellites associated with the SSN of which it forms part; and
  c) manages communications to another NPU within another SSN to establish a handover of communications with the UT from the cluster to which the NPU is associated to another cluster associated with the another SSN.

* * * * *